(12) United States Patent
Hirosawa et al.

(10) Patent No.: US 8,424,110 B2
(45) Date of Patent: Apr. 16, 2013

(54) CONTENT STORAGE APPARATUS, CONTENT STORAGE METHOD, STORAGE MEDIUM, AND PROGRAM

(75) Inventors: Hiroko Hirosawa, Kanagawa (JP); Tomoyuki Hanai, Kanagawa (JP); Takeo Morinaga, Kanagawa (JP)

(73) Assignee: Sony Corporation (JP)

( * ) Notice: Subject to any disclaimer, the term of this patent is extended or adjusted under 35 U.S.C. 154(b) by 1190 days.

(21) Appl. No.: 11/893,102

(22) Filed: Aug. 13, 2007

(65) Prior Publication Data

US 2008/0077998 A1 Mar. 27, 2008

(30) Foreign Application Priority Data

Aug. 17, 2006 (JP) ................ P2006-222492

(51) Int. Cl.
G06F 21/00 (2006.01)

(52) U.S. Cl.
USPC ........................................ 726/32; 711/100

(58) Field of Classification Search .......... 726/26, 726/31–33; 711/100, 161–162
See application file for complete search history.

(56) References Cited

U.S. PATENT DOCUMENTS

| | | | |
|---|---|---|---|
| 2001/0012440 A1 | 8/2001 | Itoi | |
| 2001/0037415 A1* | 11/2001 | Freishtat et al. | 709/328 |
| 2003/0182569 A1 | 9/2003 | Matsuzaki et al. | |
| 2004/0028228 A1 | 2/2004 | Hamada et al. | |
| 2005/0036034 A1* | 2/2005 | Rea et al. | 348/207.1 |
| 2005/0259966 A1 | 11/2005 | Yamagata et al. | |
| 2006/0020962 A1* | 1/2006 | Stark et al. | 725/32 |
| 2007/0092078 A1 | 4/2007 | Yoshida et al. | |
| 2007/0239948 A1* | 10/2007 | Muraki et al. | 711/162 |

FOREIGN PATENT DOCUMENTS

| | | |
|---|---|---|
| EP | 1404128 | 3/2004 |
| EP | 1473721 | 11/2004 |
| JP | 2001230996 A | 8/2001 |
| JP | 2003/016725 A | 1/2003 |
| JP | 2006031900 A | 2/2006 |
| JP | 2006050171 A | 2/2006 |
| JP | 2007208760 A | 8/2007 |
| JP | 2007251803 A | 9/2007 |

OTHER PUBLICATIONS

Partial European Search Report, EP 07114259, dated May 19, 2009.
Office Action from Japanese Application No. 2007-189109, dated Sep. 22, 2011.

* cited by examiner

*Primary Examiner* — Kambiz Zand
*Assistant Examiner* — John B King
(74) *Attorney, Agent, or Firm* — Lerner, David, Littenberg, Krumholz & Mentlik, LLP

(57) ABSTRACT

A content storage apparatus may include a receiving unit adapted to receive a content and service information associated with the content, a storage unit including at least a first storage area and a second storage area, adapted to store the content received by the receiving unit, and a controller adapted to determine one of the storage areas as a storage area for storing the content, in accordance with at least the service information received by the receiving unit.

46 Claims, 25 Drawing Sheets

ONCE COPY-ONCE PROGRAM
IF DUBBED, ORIGINAL CONTENT WILL BE
DELETED FROM HDD

LIST OF CONTENTS PROGRAMMED TO BE RECORDED

ONCE: CONTENT A
　　　　CONTENT B
ONCE: CONTENT C
　　　　CONTENT D

TITLE DUBBING SCREEN

CONTENT A
ONCE: CONTENT B
　　　　CONTENT C
ONCE: CONTENT D

FIG. 19

| STORAGE MEDIUM | MAXIMUM ALLOWABLE NUMBER OF COPYING OPERATIONS |
|---|---|
| BLU-RAY DISK | 5 TIMES |
| DVD | 50 TIMES |
| MEMORY CARD | 100 TIMES |

FIG. 20

| CONTENT | MAXIMUM ALLOWABLE NUMBER OF COPYING OPERATIONS |
|---|---|
| CONTENT A (MOVIE) | ONCE |
| CONTENT B (NEWS) | 100 TIMES |
| CONTENT C (DRAMA) | 10 TIMES |

FIG. 21

| STORAGE MEDIUM | CONTENT A (MOVIE) | CONTENT B (NEWS) | CONTENT C (DRAMA) |
|---|---|---|---|
| BLU-RAY DISK | ONCE | 5 TIMES | 5 TIMES |
| DVD | ONCE | 50 TIMES | 10 TIMES |
| MEMORY CARD | ONCE | 100 TIMES | 10 TIMES |

FIG. 22

TITLE LIST

CONTENT A
CONTENT B
CONTENT C
CONTENT D

YOU CAN MAKE A COPY 3 MORE TIMES

FIG. 29

TITLE LIST

| | |
|---|---|
| MAXIMUM ALLOWED COPIES: 3 | CONTENT A |
| MAXIMUM ALLOWED COPIES: 1 | CONTENT B |
| MAXIMUM ALLOWED COPIES: 5 | CONTENT C |
| MAXIMUM ALLOWED COPIES: NOT LIMITED | CONTENT D |
| | ⋮ |

FIG. 30

TITLE LIST
(CONTENTS ALLOWED TO BE COPIED WITHIN LIMITS)

CONTENT A

CONTENT C

CONTENT E

CONTENT F

⋮

YOU CAN MAKE A COPY A PLURALITY OF TIMES

FIG. 31

TITLE LIST
(CONTENTS ALLOWED TO BE COPIED WITHOUT LIMITS)

CONTENT D

CONTENT G

CONTENT H

CONTENT I

⋮

YOU CAN MAKE A COPY DESIRED NUMBER OF TIMES

FIG. 32

TITLE LIST (CONTENTS ALLOWED TO BE MOVED)

CONTENT B

CONTENT J

CONTENT K

CONTENT L

⋮

ANY OF THESE CONTENTS WILL BE DELETED FROM HDD IF COPIED

FIG. 33

LIST OF CONTENTS PROGRAMMED TO BE RECORDED

3: CONTENT A

1: CONTENT B

5: CONTENT C

F: CONTENT D

⋮

ALLOWED TO BE COPIED THREE TIMES AT MAXIMUM

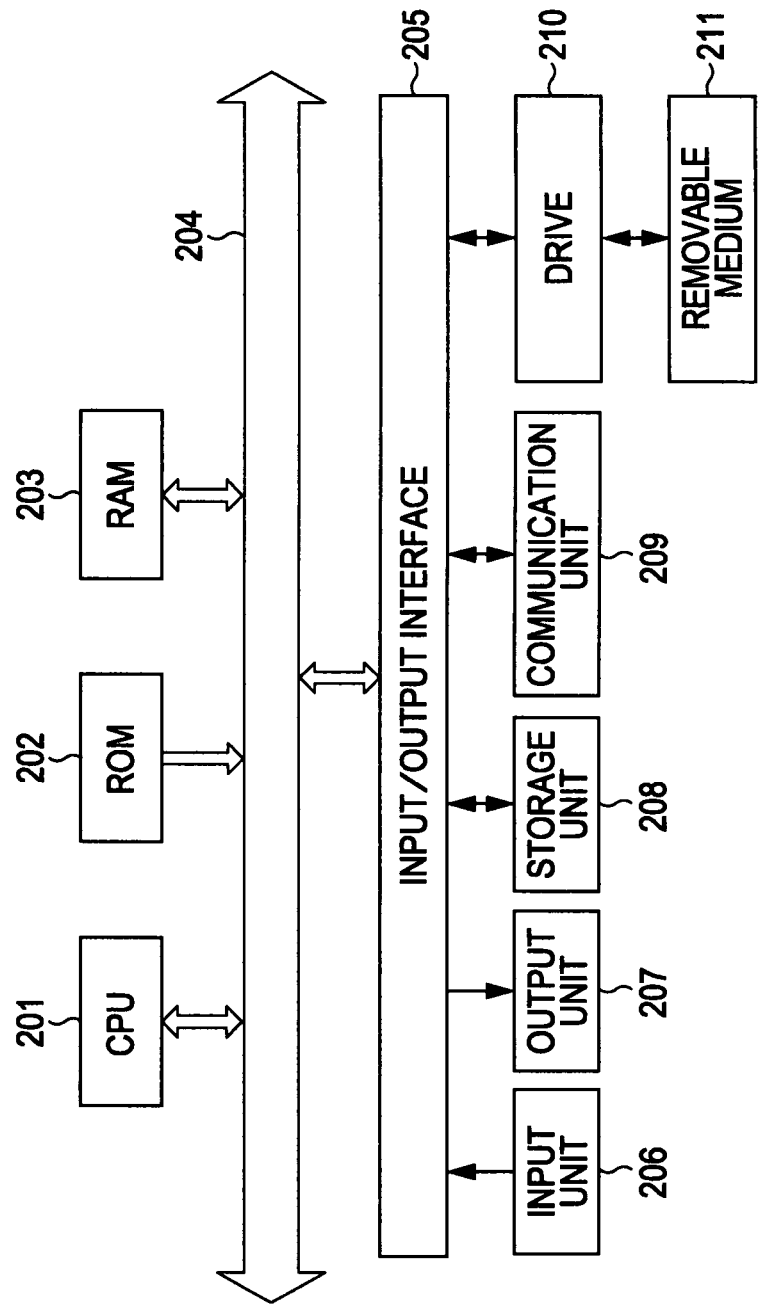

CONTENT STORAGE APPARATUS, CONTENT STORAGE METHOD, STORAGE MEDIUM, AND PROGRAM

CROSS-REFERENCE TO RELATED APPLICATIONS

This application claims priority from Japanese Patent Application No. JP 2006-222492 filed in the Japanese Patent Office on Aug. 17, 2006, the entire content of which is incorporated herein by reference.

BACKGROUND OF THE INVENTION

1. Field of the Invention

The present invention relates to a content storage apparatus, a content storage method, a storage medium, and a program, and more particularly, a content storage apparatus, a content storage method, a storage medium, and a program, capable of storing contents in different storage areas depending on restriction on copying of contents.

2. Description of the Related Art

In current digital broadcasting, copyright information of contents is defined by a digital copy control descriptor (digital_copy_control_descriptor) inserted in PSI/SI (Program Specific Information/Service Information) (hereinafter referred to simply as SI) multiplexed in a transport stream.

Digital copy control descriptors are used by copyright holders of contents to notify receiving apparatuses of information associated with restriction on copying of contents. Copy restriction defined in copyright information described in a digital copy control descriptor has following three levels: "Copy Free" (copying is allowed with no restrictions), "Copy Never" (no copying is allowed), and "Copy Once" (only first generation copying is allowed). At present, all digital broadcast programs are set as copy-once contents.

If a copy-once content is once stored in an HDD (Hard Disk Drive) of a storage apparatus, this content is defined as an one-generation-copied content and CCI for this content is changed into "Copy Never". CCI is information stored in the storage apparatus to define copy restriction for each content.

Thereafter, although a user is allowed to play back the content from the HDD, it is not allowed to copy the content from the HDD into a DVD disk, even if the storage apparatus has a built-in DVD drive in addition to the HDD.

If many contents are stored in the HDD, the HDD will eventually have no more free storage space, because the storage capacity of the HDD is limited. To store more contents in a state in which the HDD has no more free storage space, it is necessary to delete existing contents to create a free storage space. However, a content which was set as a "Copy Never" content when it was stored in the HDD cannot be further copied to another medium such as a DVD disk, before it is deleted from the HDD.

A technique called "move" is provided to avoid the above-described problem.

In the "move" technique, a copy-once content stored in an HDD is allowed to be moved to a removable storage medium such as a DVD disk or a Blu-ray disk (trademark). However, when copying from the HDD to the removable storage medium is completed, the original content stored in the HDD is completely deleted. Thus, "move" allows a content to be moved into a removable storage medium in a usable form, although the original content is deleted from the HDD.

After a content is moved from the HDD into a removable storage medium, a user is allowed to play back the content from the removable storage medium using a proper player.

Japanese Unexamined Patent Application Publication No. 2003-16725 discloses a technique to perform a move process or a pause process in accordance with a Move_Pause descriptor described in a PMT (Program Map Table).

SUMMARY OF THE INVENTION

Standards associated with various technical items of digital broadcasting, including restrictions on copying, have been established by ARIB (Association of Radio Industries and Businesses). It is expected that the standards will be revised in the future such that contents stored in a special storage area of an HDD are allowed to be moved a predetermined number of times, even if contents are of copy-once type.

In the future revised version of the standards, the storage size of such a special storage area may be limited to a particular value, and/or the number of copy-once contents stored in the special storage area may be limited.

In such a future version, it may be necessary to properly manage contents stored in the special storage area of the HDD. For example, if the maximum size of the special storage area is limited, a user needs to know the size of available free space remaining in the special storage area, for example, by checking information displayed on a display of an apparatus, before the user decides whether to store a new content in the special storage area.

At present, all programs are broadcast as copy-once contents, there is no need to determine whether a content is of copy-once type or other types. However, when other types of contents are broadcast in the future, there will be a possibility that copy-once contents and other types of contents are stored in the same HDD. Thus, it will be necessary to provide a technique that allows a user to easily understand what copy restriction is imposed on a content.

In view of the above, it is desirable to provide a technique to store a content in a proper one of a plurality of storage areas of a storage unit depending on the copy restriction defined for the content.

According to an aspect of the present invention, there is provided a content storage apparatus which may include receiving means for receiving a content and service information associated with the content, storage means including at least a first storage area and a second storage area, for storing the content received by the receiving means, and control means for determining one of the storage areas as a storage area for storing the content, in accordance with at least the service information received by the receiving means.

The first storage area and the second storage area may be partitioned according to the service information.

The content may be a copy-once content set as allowed to be copied for one generation. When a copy-once content stored in the first storage area is stored in another storage medium, the original content stored in the first storage area may be retained without being deleted, while when a copy-once content stored in the second storage area is stored in another storage medium, the original content stored in the second storage area may be deleted.

The control means may have correspondence information prestored therein and indicating the correspondence between the service information and a storage destination selected from the storage areas of the storage means.

The first storage area may be restricted on the total data size of contents stored therein.

The content storage apparatus may further include means for notifying a user of the total data size of already stored contents and notifying of the size of remaining free space given by the subtraction of the total data size of already stored contents from a predetermined value, by providing the notification in a visible or audible form via a screen or an audio output apparatus.

The content storage apparatus may further include means for notifying a user of the total data size of already stored contents and notifying of the size of remaining free space given by the subtraction of the total data size of already stored contents from a predetermined value, by providing the notification to the user by electronic mail.

The content storage apparatus may further include means for, when the size of free space remaining in the first storage area decreased to a low level, saving one or more contents stored in the first storage area to an external storage medium.

The first storage area may be restricted on the total number of contents stored therein.

The content storage apparatus may further include medium storage means for moving or copying a content stored in one of the storage areas to another removable storage medium. In this case, the control means may control a storage operation such that when a content, which is stored in the first storage area and which is set as allowed to be copied up to N times, is copied to another storage medium N times, playback of this content is disabled by deleting the content or while retaining the content in the first storage area.

When the content storage apparatus further includes medium storage means for moving or copying a content stored in one of the storage areas to another removable storage medium, the control means may control a storage operation such that when a content stored in the second storage area is moved to another storage medium, playback of this content is disabled by deleting the content from the second storage area.

The content storage apparatus may further include means for notifying a user of the maximum allowable number of copying operations, by providing the notification in a visible or audible form via a screen or an audio output apparatus.

The content storage apparatus may further include means for notifying a user of the maximum allowable number of copying operations, by providing the notification by electronic mail.

Copy-free contents allowed to be copied without restriction may be stored in the second storage area.

The control means may determine, according also to a setting of the first and second storage areas, whether the content should be stored in the first storage area or the second storage area of the storage means.

The content storage apparatus may further include means for notifying a user that if the content is stored in another storage medium, the original content will be deleted and/or the content stored in another storage medium will has a resolution less than the resolution of the original content, by providing the notification in a visible or audible form via a screen or an audio output apparatus.

The first storage area and the second storage area may be physically or logically partitioned.

According to another embodiment, the present invention provides a content storage method, a content storage program, and a storage means in which a content storage program is stored, wherein the method or the program may include receiving a content and service information associated with the content, storing the received content in storage means including at least a first storage area and a second storage area, and determining one of the storage areas as a storage area for storing the content, in accordance with at least the received service information.

According to an embodiment of the present invention, there is provided a content storage apparatus which may include means for displaying a list of contents on a screen in such a manner that copy-once contents set as allowed to be copied for one generation are distinguished from the other contents.

The list of contents may be a title list of contents already stored, a broadcast program table, a list of contents programmed to be automatically stored, or a content list for use to select a content to be stored in another storage medium.

The content storage apparatus may further include means for displaying the list of contents in such a manner that a list of copy-once contents set as allowed to be copied for one generation and a list of the other contents are displayed separately and distinguishably, in accordance with a command issued by a user.

The content storage apparatus may further include means for, when a copy-once content is selected by a user from the list of contents, displaying a text message to provide information associated with copying of the selected copy-once content.

According to an embodiment of the present invention, there is provided a content storage apparatus which may include storage means including at least a first storage area and a second storage area, for storing a content, and control means for controlling a storage operation such that an entity and a clone of a copy-once content set as allowed to be copied up to a predetermined number of times are stored in the first storage area, and such that if the copy-once content is copied using the clone thereof the predetermined number of times, the entity of the copy-once content is moved to the second storage area, wherein after the copy-once content is moved to the second storage area, copying of this copy-once content is disabled.

According to an embodiment of the present invention, there is provided a content storage apparatus which may include storage means including at least a first storage area and a second storage area, for storing a content, and control means for controlling a storage operation such that an entity of a copy-once content set as allowed to be copied up to a predetermined number of times is stored in the second storage area, and as many clones of this copy-once content as the predetermined number of times copying is allowed are stored in the first storage area, and such that each time the copy-once content is copied using one of clones thereof, the one of clones of the copy-once content is deleted from the first storage area, wherein copying of the copy-once content using the entity thereof stored in the second storage area is disabled.

As described above, in an embodiment of a content storage apparatus, a content and service information associated with the content may be received, and the received content may be stored in storage means including at least a first storage area and a second storage area, wherein according to at least the received service information, one of the storage areas may be determined as a storage area for storing the content.

In another embodiment of a content storage apparatus, as described above, a list of contents may be displayed on a screen in such a manner that copy-once contents set as allowed to be copied for one generation are distinguished from the other contents.

In another embodiment of a content storage apparatus, as described above, a content may be stored in storage means including at least a first storage area and a second storage area, wherein a storage operation may be controlled in such a manner that an entity and a clone of a copy-once content set as allowed to be copied up to a predetermined number of times are stored in the first storage area, and such that if the copy-once content is copied using the clone thereof the predetermined number of times, the entity of the copy-once content is moved to the second storage area. After the copy-once content is moved to the second storage area, copying of this copy-once content may be disabled.

In another embodiment of a content storage apparatus, as described above, a content may be stored in storage means including at least a first storage area and a second storage area, wherein a storage operation may be controlled in such a manner that an entity of a copy-once content set as allowed to be copied up to a predetermined number of times is stored in the second storage area, and as many clones of this copy-once content as the predetermined number of times copying is allowed are stored in the first storage area, and such that each time the copy-once content is copied using one of clones thereof, the one of clones of the copy-once content is deleted from the first storage area, and such that copying of the copy-once content using the entity thereof stored in the second storage area is disabled.

As described above, the present invention provides an advantage that contents may be stored in different storage areas of storage means in accordance with at least service information.

BRIEF DESCRIPTION OF THE DRAWINGS

FIG. 19 is a diagram illustrating examples of restrictions on the number of copying operations;

FIG. 20 is a diagram illustrating examples of restrictions on the number of copying operations;

FIG. 21 is a diagram illustrating examples of restrictions on the number of copying operations;

FIG. 22 is a diagram of illustrating an example of displaying a title list with a message indicating the maximum number of times contents are allowed to be copied;

FIG. 29 illustrates examples of displayed title lists;
FIG. 30 illustrates examples of displayed title lists;
FIG. 31 illustrates examples of displayed title lists;
FIG. 32 illustrates examples of displayed title lists;
FIG. 33 is a diagram illustrating an example of displayed list of contents programmed to be recorded;

FIG. 35 is a block diagram illustrating an example of a personal computer.

DETAILED DESCRIPTION

Before describing an embodiment of the present invention, the correspondence between the features of the invention and the specific elements disclosed in embodiments of the present invention is discussed below. This description is intended to assure that embodiments supporting the invention are described in this specification. Thus, even if an element in the following embodiments is not described as relating to a certain feature of the present invention, that does not necessarily mean that the element does not relate to that feature of the claims. Conversely, even if an element is described herein as relating to a certain feature of the invention, that does not necessarily mean that the element does not relate to other features of the invention.

Figure 1:
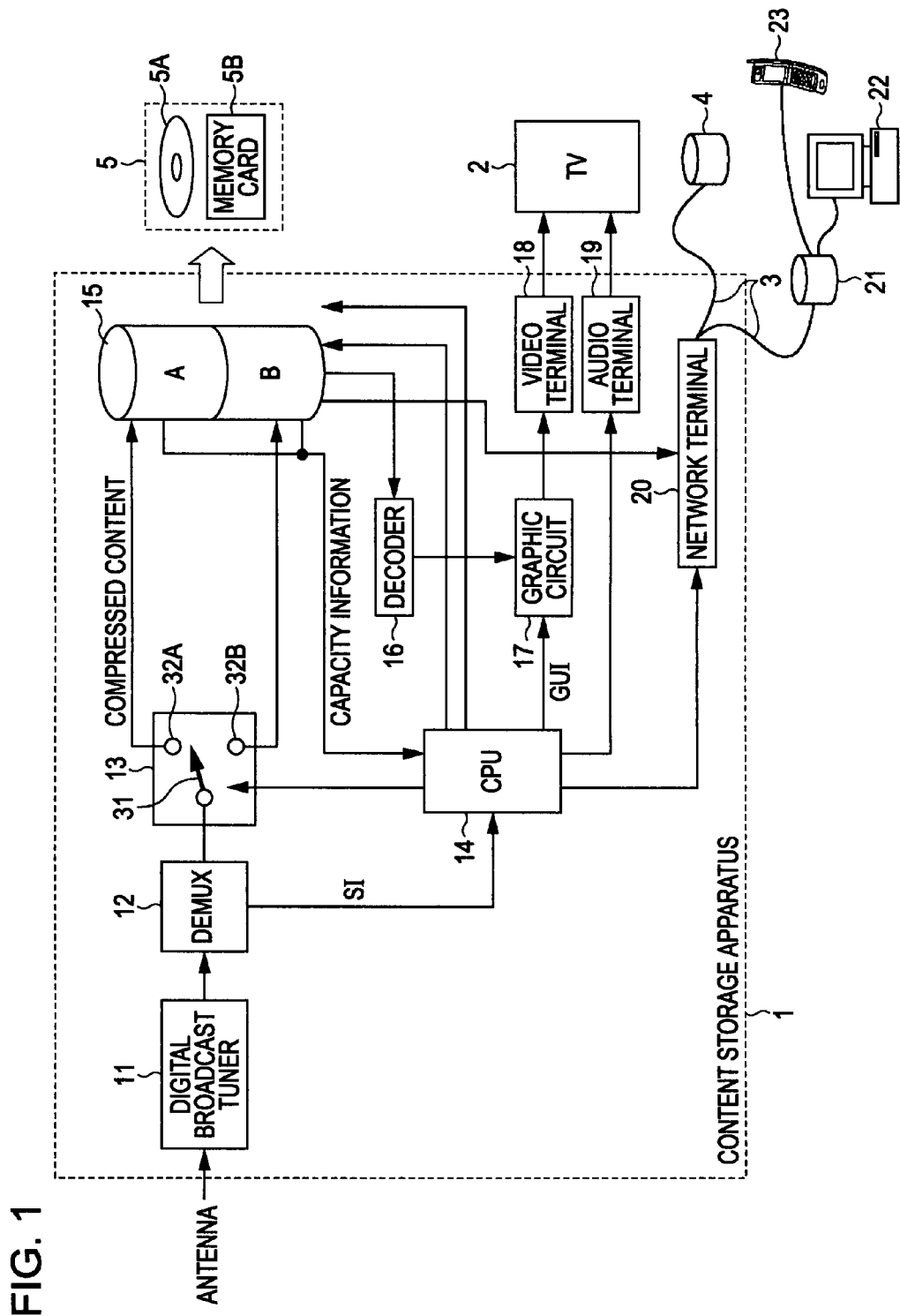
FIG. 1 is a block diagram illustrating an example of a configuration of a content storage apparatus according to an embodiment of the present invention.
Figure 26:
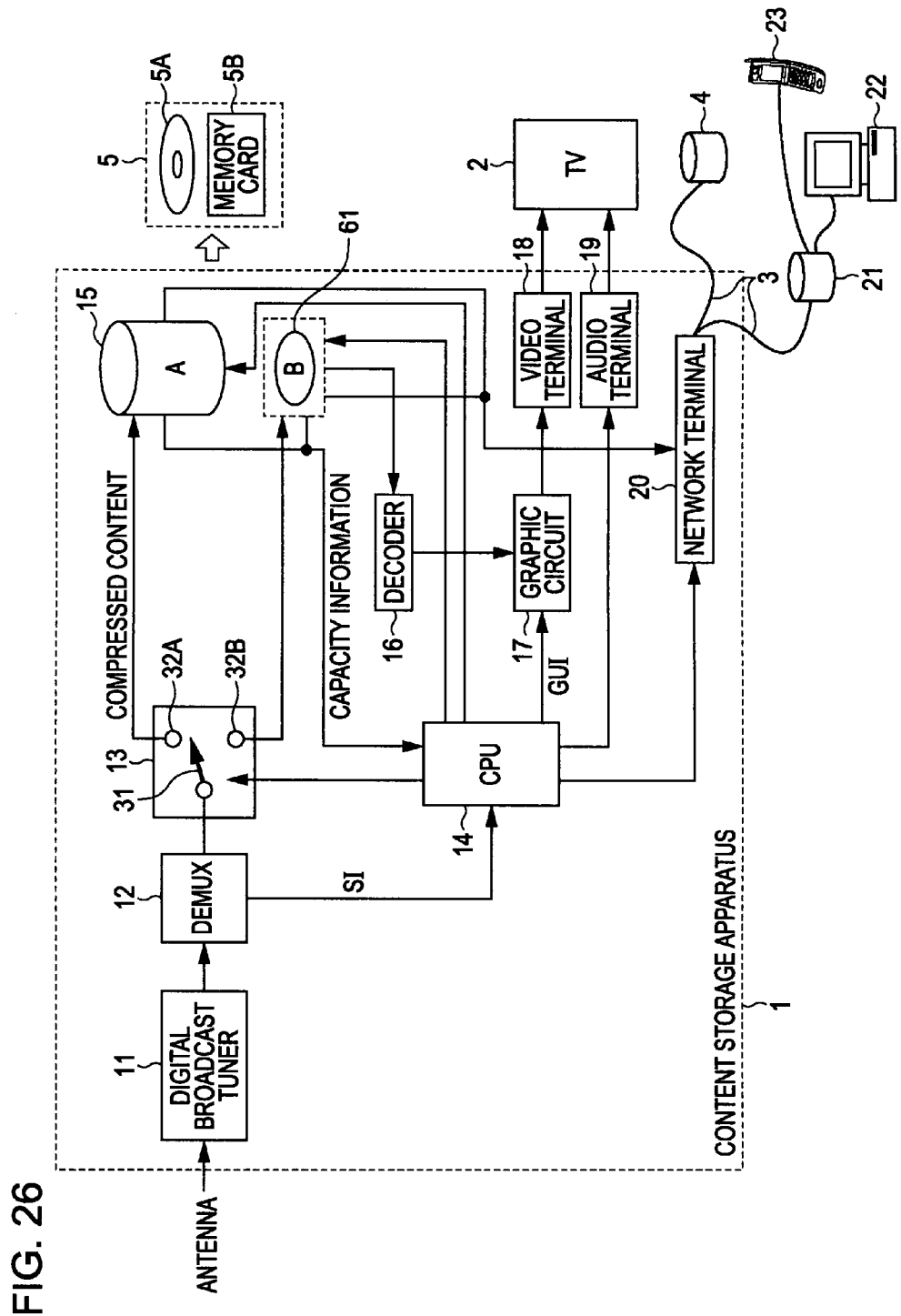
FIG. 26 is a block diagram illustrating an example of a configuration of a content storage apparatus according to an embodiment of the present invention.

According to an embodiment of the present invention, there is provided a content storage apparatus (for example, a content storage apparatus 1 shown in FIG. 1 or FIG. 26) including receiving means (for example, a digital broadcast tuner 11 shown in FIG. 1) for receiving a content and service information associated with the content, storage means including at least a first storage area and a second storage area, for storing the content received by the receiving means, an HDD 15 shown in FIG. 1 or a combination of an HDD 15 and a removable storage medium 61 shown in FIG. 26 and control means (for example, a storage controller 42 shown in FIG. 2) for determining one of the storage areas as a storage area for storing the content, in accordance with at least the service information received by the receiving means.

Figure 3:
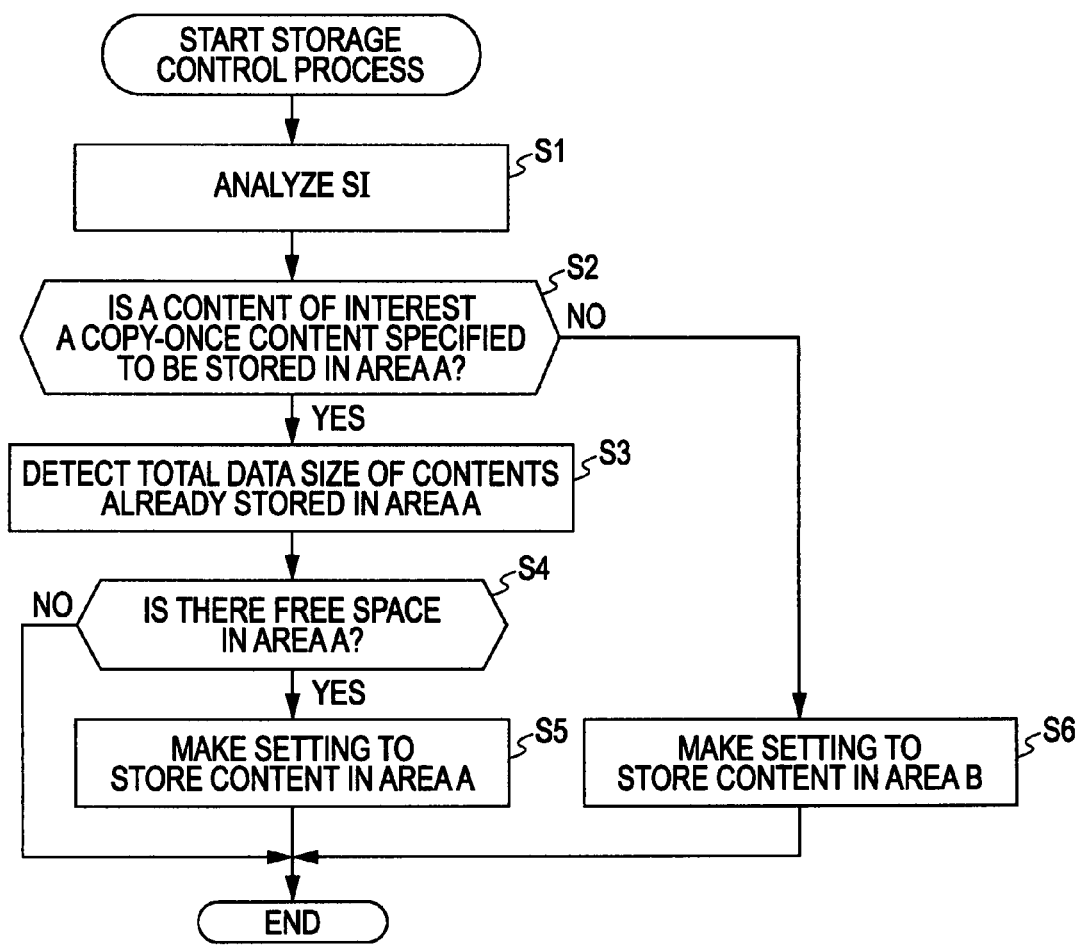
FIG. 3 is a flow chart illustrating a storage control process performed by a content storage apparatus according to an embodiment of the present invention.

According to another embodiment, the present invention provides a content storage method, a content storage program, and a storage means in which a content storage program is stored, wherein the method or the program includes the steps of receiving a content and service information associated with the content, storing the received content in storage means including at least a first storage area and a second storage area, and determining one of the storage areas as a storage area for storing the content, in accordance with at least the received service information (for example, in step S2 in FIG. 3).

Now, embodiments of the present invention are described below with reference to the accompanying drawings.

FIG. 1 is a block diagram illustrating an example of a configuration of a content storage apparatus 1 according to an embodiment of the present invention.

In the example shown in FIG. 1, the content storage apparatus 1 is connected to a television set 2 via a cable, and connected to an external storage medium 4 via a network 3. As required, removable storage media 5 are removably mounted on the content storage apparatus 1. The removable storage media 5 include a Blu-ray disk 5A and a memory card 5B using a flash memory.

In the content storage apparatus 1, under the control of a CPU (Central Processing Unit) 14, a digital broadcast tuner 11 receives a broadcast signal via an antenna, demodulates the received broadcast signal, and outputs a transport stream broadcast in a particular channel to a demultiplexer (DEMUX) 12.

The DEMUX 12 descrambles the transport stream supplied from the digital broadcast tuner 11, and extracts a particular stream from the descrambled transport stream, under the control of CPU 14. The extracted stream is supplied, as a content to be stored, to a switching circuit 13.

The DEMUX 12 extracts SI (Service Information) from the transport stream and supplies the extracted SI to the CPU 14. The SI supplied to the CPU 14 includes information defining restriction on copying of each broadcast content.

Under the control of the CPU 14, the switching circuit 13 connects a switch 31 to a terminal 32A or a terminal 32B so that the content in a form compressed according to the MPEG (Moving Picture Experts Group) 2 standard or the like is transferred from the DEMUX 12 to an HDD (Hard Disk Drive) 15. In a state in which the switch 31 is connected to the terminal 32A, the content output from the switching circuit 13 is stored in a storage area A of the HDD 15. On the other hand, in a state in which the switch 31 is connected to the terminal 32B, the content output from the switching circuit 13 is stored in a storage area B of the HDD 15.

The CPU 14 controls the operation over the whole content storage apparatus 1 by executing a program stored in a ROM (Read Only Memory) not shown in FIG. 1.

More specifically, for example, the CPU 14 analyzes SI supplied from the DEMUX 12 and determines, on the basis of an analysis result and a setting of a storage destination, which one of storage areas of the HDD 15 a content of interest should be stored in.

In a case in which the CPU 14 determines that the content of interest to be stored is a copy-once content allowed to be copied for one generation and specified to be stored in the storage area A of the HDD 15, the CPU 14 controls the switching circuit 13 such that the switch 31 is connected to the terminal 32A.

In a case where a user has made a setting in terms of storage areas of the content storage apparatus 1 such that the storage area A is specified as an area for storing copy-once contents, or in a case where the storage area A is specified as a default area for storing copy-once contents, the CPU 14 determines that the storage area A of the HDD 15 is specified as a storage area for storing the copy-once content of interest.

On the other hand, in a case where the CPU 14 determines that the content of interest to be stored is a copy-once content and that the storage area B of the HDD 15 is specified as a storage area for storing the content of interest, or in a case where the CPU 14 determines that the content of interest to be stored is of a type, such as a copy-free content, other than copy-once contents, the CPU 14 controls the switching circuit 13 such that the switch 31 is connected to the terminal 32B.

The CPU 14 acquires, from the HDD 15, capacity information associated with the capacity of each storage area of the HDD 15, and notifies the user of the storage capacity. For example, the CPU 14 represents, in a graphical or audio form, the relative storage space occupied by stored contents with respect to the total storage space, for each storage area. When the remaining free space available for storing contents has become small, the CPU 14 provides a notification, in a graphical or audio form, of the fact that there is no sufficient remaining free space.

The CPU 14 also controls an operation of dubbing a content stored in the HDD 15 to a removable storage medium 5. Note that "dub" is a generic expression including "move" and "copy". "Move" refers to a process of storing a content currently stored in the HDD 15 into a removable storage medium 5 and deleting the original content from the HDD 15. "Copy" refers to a process of storing a content currently stored in the HDD 15 into a removable storage medium 5 while retaining the original content in the HDD 15.

The HDD 15 has a storage area A and a storage area B formed in a total storage area of the HDD 15, and a content output from the switching circuit 13 is stored in the storage area A or B. The storage areas A and B may be physically or logically partitioned.

In the example shown in FIG. 1, the storage area A is special in that when a copy-once content stored in this area is "moved" to a removable storage medium 5, the original content is allowed to remain in this area without being deleted. When there is defined a restriction on the maximum number of times the content is allowed to be copied, the content is allowed to be copied up to the defined maximum number of times.

On the other hand, when a copy-once content stored in the storage area B is moved to the removable storage medium 5, the original content is forced to be deleted. That is, the storage area B is an ordinary storage area. Copy-free contents stored in the storage area B are allowed to be copied unlimitedly.

A restriction may be imposed on a storage area specified as an area for storing copy-once contents which are allowed to remain in the storage area even after moving is performed. For example, when the HDD 15 has a total storage capacity of 200 GB, the storage capacity of the storage area A is limited to 50 GB.

This prevents all copy-once contents from being copied a plurality of times thereby protecting holders of copyright of contents while improving convenience of users. If a user wants to see a particular content by playing it back on the content storage apparatus 1 and also wants to store the same content on a removable storage medium 5 so that the content can be played back from the removable storage medium 5 using another player or the like, the user may store that content in the storage area A.

If the content is copied to the removable storage medium 5 or the like as many times as the maximum allowable number of times, no more copying is allowed. In this case, the content may be transferred to the storage area B so that the content is treated as a usual copy-once content that can be moved in a usual manner.

In one mode, data of all copy-once contents are first stored in the storage area B, and copy-once contents allowed to be copied are also stored in the storage area A.

When the storage area A and the storage area B are managed in the above-described manner, and the capacity of the storage area A or the number of contents stored in the storage area A is restricted, a free storage space in the storage area A can be increased by transferring one or more copy-once contents from the storage area A to the storage area B thereby making it possible to store new one or more copy-once contents, which are allowed to be copied a plurality of times, in the increased free storage space in the storage area A.

When a particular copy-once content in the storage area A has been copied as many times as the maximum allowed number of times and thus this copy-once content has been transferred to the storage area B, if the content is moved back from the removable storage medium or the like, then the content is again transferred into the storage area A from the storage area B and managed in the same manner as before. Note that "move back" refers to a process of deleting the content from the removable storage medium 5 and the right of using the content is restored in accordance with backup data of the original content. The restored content is equal in image quality to the original content.

When a user issues a command to display a title list of contents stored in the storage area A, the copy-once content transferred into the storage area A in response to the moving back is included in the displayed title list. Thus, the user is allowed to select this copy-once content from the title list and issue a command to play back or make a copy of the copy-once content.

Contents stored in the storage area A or the storage area B of the HDD 15 are supplied, as required, to a decoder 16 or a network terminal 20.

The decoder 16 decodes video data (video packets) supplied from the HDD 15 and supplies the resultant video data to a graphic circuit 17. On the basis of the vide data supplied from the decoder 16, the graphic circuit 17 produces an image of the content. Although only a transmission path of video data is shown in FIG. 1, audio data is also decoded by a decoder not shown in FIG. 1, and a voice/sound is output in accordance with the resultant decoded audio data.

In accordance with GUI (Graphical User Interface) data supplied from the CPU 14, the graphic circuit 17 produces data, for each storage area, graphically indicating the ratio of the size of storage space occupied by contents already stored in a storage area to the total size of storage space of the storage area, and displays the resultant graphic information on the TV 2 via a video terminal 18. In accordance with the video data supplied from the decoder 16, the graphic circuit 17 displays an image of a stored content on the TV 2 via the video terminal 18.

The video terminal 18 displays various images on the TV 2 in accordance with data supplied from the graphic circuit 17.

The audio terminal 19 outputs various voices/sounds via a speaker of the TV 2 in accordance with data supplied from the CPU 14. For example, voice information indicating the capacity of the HDD 15 or the like is output from the TV 2.

Under the control of the CPU 14, the network terminal 20 reads a content stored in the HDD 15 and stores the read content in an external storage medium 4 such as an HDD. Furthermore, also under the control of the CPU 14, the network terminal 20 sends a message indicating the capacity of the HDD 15 to a personal computer 22 or a portable telephone 23 via a mail server 21 to notify the user of the capacity of the HDD 15.

Figure 2:
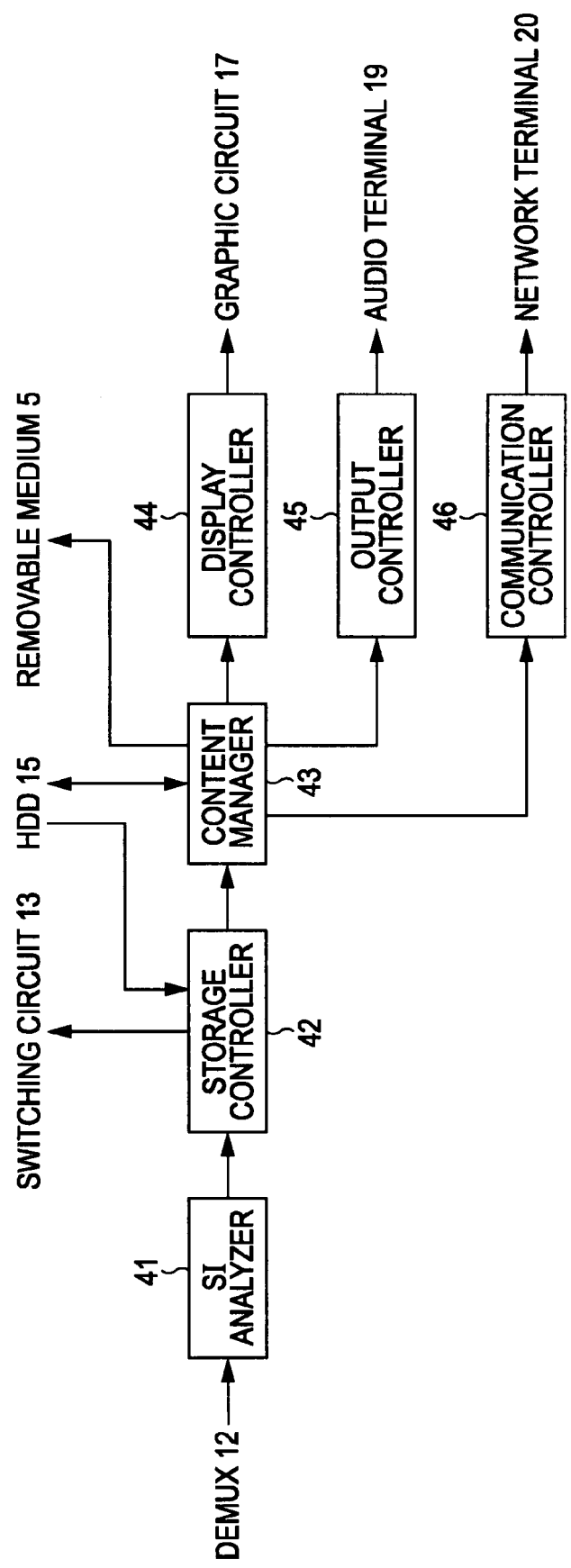
FIG. 2 is a block diagram illustrating an example of a functional configuration of a content storage apparatus according to an embodiment of the present invention.

FIG. 2 is a block diagram illustrating an example of a functional configuration of the CPU 14 of the content storage apparatus 1 according to an embodiment of the present invention. At least some or all of functions shown in FIG. 2 are implemented by executing a program by the CPU 14 shown in FIG. 1.

As shown in FIG. 2, the functional blocks of the content storage apparatus 1 include a SI analyzer 41, a storage controller 42, a content manager 43, a display controller 44, an output controller 45, and a communication controller 46.

The SI analyzer 41 analyzes SI supplied from the DEMUX 12 and produces CCI (Copy Control Information) indicating restriction on copying of a content of interest to be stored according to the analysis result. The resultant CCI is supplied to the storage controller 42.

In accordance with the CCI supplied from the SI analyzer 41 or a command issued by a user, the storage controller 42 switches the connection of the switch 31 in the switching circuit 13 to control the storage area of the HDD 15 into which to store the content of the interest. In the controlling of the storage area of the HDD 15 into which to store the content of interest, the storage controller 42 checks, as required, the size of available storage space in the storage area of the HDD 15. After the storage controller 42 stores the content in the HDD 15, the storage controller 42 supplies the CCI associated with the stored content to the content manager 43. Instead of according to CCI, the switch 31 may be switched according to another descriptor supplied via a broadcasting signal or playback control information or DRM (Digital Rights Management) information supplied via the network 3.

The content manager 43 manages contents stored in the HDD 15. For example, if a user issues a command to dub a content stored in the HDD 15, then the content manager 43 dubs the specified content from the HDD 15 to the removable storage medium 5 in accordance with the restriction indicated by the CCI supplied from the storage controller 42.

The content manager 43 acquires, from the HDD 15, capacity information associated with the capacity of each storage area of the HDD 15, and the content manager 43 provides information associated with capacity to the user by controlling the display controller 44, the output controller 45, or the communication controller 46. The content manager 43 also displays a list of contents stored in the HDD 15 on the TV 2 by controlling the display controller 44.

The display controller 44 produces GUI data under the control of the content manager 43, and outputs the produced GUI data to the graphic circuit 17 to display information on the TV 2. For example, information associated with the capacity of the HDD 15 is displayed on the TV 2 to provide a notification to the user.

Under the control of the content manager 43, the output controller 45 outputs a voice/sound from the TV 2 via the audio terminal 19 to provide a notification associated with the capacity of the HDD 15 to the user.

Under the control of the content manager 43, the communication controller 46 transmits a content stored in the HDD 15 to the external storage medium 4 via the network terminal 20 to store the content in the external storage medium 4. The communication controller 46 provides a notification of the capacity of the HDD 15 to the user by sending e-mail via the network terminal 20 and the mail server 21. The communication controller 46 has a pre-stored e-mail address of the personal computer 22 of the portable telephone 23 of the user.

The content storage apparatus 1 configured in the above-described manner operates as follows.

First, referring to a flow chart shown in FIG. 3, a process of controlling a content storage operation performed by the content storage apparatus 1 is described below.

Note that as described above, storing, in the storage area A, of copy-once contents which are allowed to be moved to a removable storage medium 5 without deleting original contents is allowed not unlimitedly but within the limit on the capacity defined for the storage area A.

The process shown in the flow chart of FIG. 3 is performed, for example, when programming of automatically recording a content is set. When a content to be stored is selected by a user from a broadcast program table or the like, SI associated with the selected content is extracted by the DEMUX 12 and supplied to the SI analyzer 41. After the content to be stored is selected, the user further selects a storage area of the HDD 15 into which to store the content.

Instead of the broadcast program table, a content to be stored may be selected from a VOD (Video On Demand) content list. In this case, that is, when a content to be stored is selected from the VOD (Video On Demand) content list, the content to be stored is acquired via a content acquisition unit disposed instead of or in addition to the digital broadcast tuner 11, and playback control information or DRM (Digital Rights Management) information is acquired via the network 3 such as the Internet. The acquired playback control information or DRM (Digital Rights Management) information is analyzed, and, in accordance with an analysis result, a determination is made as to which storage area the content should be stored in.

As described above, the content storage apparatus 1 may be configured to have the capability of acquiring contents via the network 3. A specific example of a content storage apparatus 1 having a unit for acquiring contents via the network 3 instead of the digital broadcast tuner 11 will be described later. In the following discussion, it is assumed that processing is performed on contents acquired via broadcast waves. However, techniques of processing contents disclosed below may also be applied to contents acquired via the network 3. In this case, the processing may be performed in accordance with playback control information or DRM (Digital Rights Management) information associated with contents.

In step S1, the SI analyzer 41 analyzes SI and supplies, to the storage controller 42, CCI associated with a content specified to be stored.

In step S2, in accordance with the CCI supplied from the SI analyzer 41 and the setting made by a user or the default setting, the storage controller 42 determines whether the content to be stored is a copy-once content specified to be stored in the storage area A of the HDD 15.

If the storage controller 42 determines in step S2 that the content to be stored is a copy-once content requested to be stored in the storage area A of the HDD 15, the storage controller 42 advances the process to step S3. In step S3, the storage controller 42 accesses the HDD 15 to detect the total data size of contents already stored in the storage area A.

In step S4, the storage controller 42 determines whether the result of checking in step S3 indicates that the storage area A has an enough free storage space to store the copy-once content of interest.

If the storage controller 42 determines in step S4 that the storage area A has an enough free storage space to store the copy-once content, the storage controller 42 advances the process to step S5. In step S5, the storage controller 42 sets the automatic recording programming such that the copy-once content of interest will be stored in the storage area A, and, thereafter, the storage controller 42 ends the present process. When broadcasting of the copy-once content specified to be stored is started, the switch 31 of the switching circuit 13 is connected to the terminal 32A, and the received copy-once content is stored in the storage area A.

On the other hand, in a case where the storage controller 42 determines in step S4 that the storage area A does not have an enough free storage space to store the copy-once content of interest, the storage controller 42 skips step S5 and ends the present process. In this case, the storage controller 42 may set the automatic recording programming such that the copy-once content of interest will be stored in the storage area B when the copy-once content is broadcast.

In a case where the result of the determination made in step S2 on the basis of the CCI supplied from the SI analyzer 41 and the setting made by the user or the default setting indicates that the content of interest is not a copy-once content specified to be stored in the storage area A of the HDD 15, that is, the content of interest is a copy-once content specified to be stored in the storage area B of the HDD 15 or a copy-free content, the storage controller 42 advances the process to step S6.

In step S6, the storage controller 42 sets the automatic recording programming such that the content of interest will be stored in the storage area B, and, thereafter, the storage controller 42 ends the present process. When broadcasting of the content of interest is started, the switch 31 of the switching circuit 13 is connected to the terminal 32B, and the received content is stored in the storage area B. Note that when the storage area B is specified as a storage area for storing a content, checking is also performed as to whether the storage area B has an enough storage space to store the content.

The manner of controlling the operation of storing copy-once contents in the storage area A depending on the capacity of the storage area A has been described above.

Figure 4:
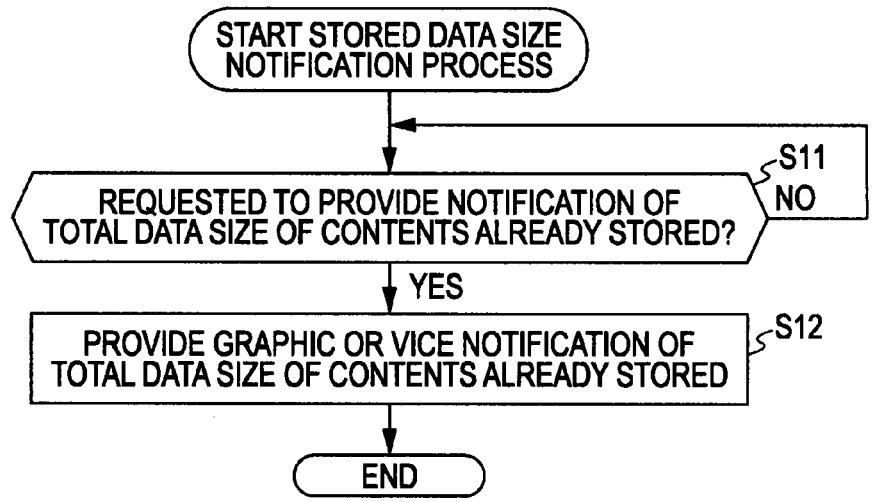
FIG. 4 is a flow chart illustrating a process of providing a notification of the data size of a stored content, performed by a content storage apparatus according to an embodiment of the present invention.

Next, referring to a flow chart shown in FIG. 4, described below is a process performed by the content storage apparatus 1 to provide a notification of the total data size of already stored contents to a user.

In step S11, the content manager 43 determines whether a user has issued a request for a notification of the total data size of contents already stored in the HDD 15. If it is determined that the request has not been issued, the process waits in step S11 until the request is issued. Note that issuing of the command is performed, for example, via a remote control.

If the content manager 43 determines in step S11 that the user has issued the request for the notification of the total data size of already stored contents, the content manager 43 advances the process to step S12. In step S12, the content manager 43 accesses the HDD 15 to acquire capacity information associated with the capacity of each of the storage area A and the storage area B or a particular storage area specified by the user. The content manager 43 then controls the display controller 44 and the output controller 45 to display graphic information on the TV 2 and/or output audio information from the TV 2 to provide the notification of the total data size of already stored contents.

The graphic information indicating the total data size of already stored contents is given, for example, in the form of a circular chart or a bar chart indicating the relative storage space occupied by already stored contents and the relative remaining free space with respect to the total storage space such that each part of the chart is highlighted with color depending on the storage capacity so that the user can visually understand the size of the used storage space and the size of the free storage space.

Figure 5:
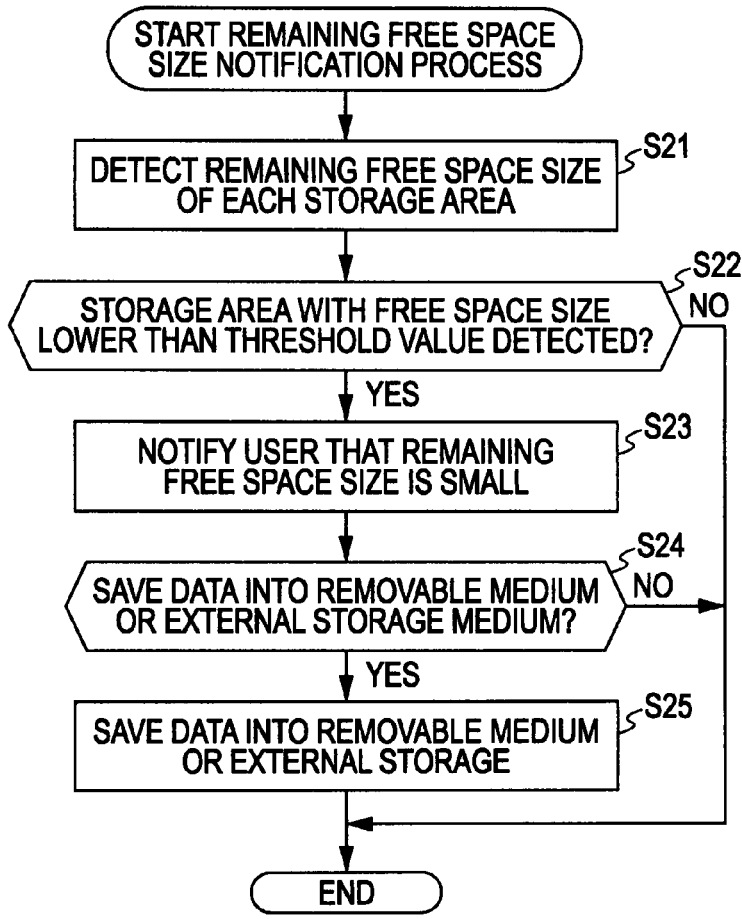
FIG. 5 is a flow chart illustrating a process of providing a notification of the size of remaining available free space, performed by a content storage apparatus according to an embodiment of the present invention.

Next, referring to a flow chart shown in FIG. 5, described below is a process performed by the content storage apparatus 1 to notify a user of the size of the free storage space.

This process is performed, for example, at a predetermined intervals or at a particular time such as after an automatic recording operation of storing a specified content is completed.

In step S21, the content manager 43 accesses the HDD 15 to acquire capacity information associated with the capacity of each of the storage area A and the storage area B. The content manager 43 then detects the free space remaining in each storage area from the acquired capacity information.

In step S22, the display controller 44 determines whether the size of the free space of each storage area is less than a predetermined threshold value. If the determination is affirmative, the process proceeds to step S23. In step S23, the display controller 44 notifies a user that the size of the free space of a particular storage area has decreased to a low level.

For example, when 50 GB is allocated to the storage area A, if the size of the free space remaining in the storage area A becomes smaller than 5 GB, the notification is provided to the user. Alternatively, for example, when the size of the free space remaining in a particular storage area becomes not enough to store a content for one hour, the notification is provided to a user. The threshold value of remaining free space expressed in units of GB or hours may be specified by a user.

Figure 6:
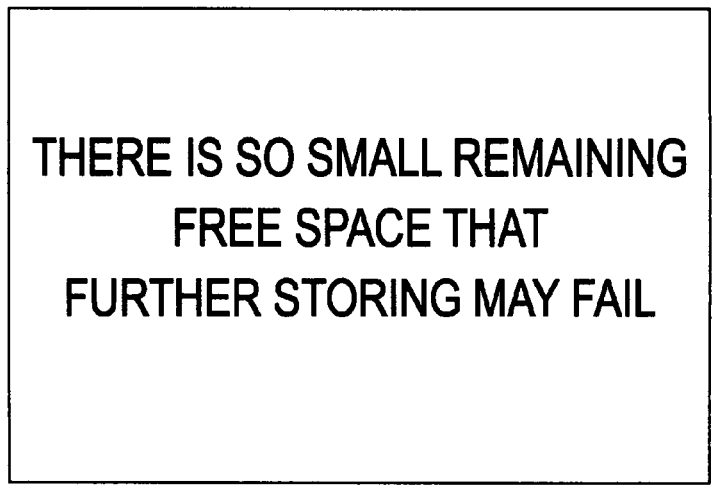
FIG. 6 is a diagram illustrating an example of a notification provided to a user.

The notification to the user may be provided by displaying, on the TV 2, a text message saying, for example, "Free space in storage area A is now very low", under the control of the display controller 44, or an audio message may be output from the TV 2 under the control of the output controller 45. A message such as that shown in FIG. 6 may be transmitted by e-mail to a portable telephone or the like of the user via the communication controller 46.

The content storage apparatus 1 may be set such that when the size of the remaining free size becomes low, contents allowed to be moved or copied are automatically saved to the external storage medium 4 or the removable storage medium 5. Thus, in step S24, the content manager 43 determines whether the content storage apparatus 1 is set as such and thus contents stored in a storage area having a small remaining free space should be saved.

If the content manager 43 determines in step S24 that contents stored in the storage area having the small remaining free space should be saved, the content manager 43 advances the process to step S25. In step S25, the content manager 43 saves the contents stored in the storage area having the small remaining free space, and, thereafter, the content manager 43 ends the present process.

In the above-described process, for example, when the storage area A has a small remaining free space, copy-once contents stored in the storage area A are saved into the external storage medium 4 to create enough free space in the storage area A. The copy-once contents saved in the external storage medium 4 may be automatically returned to the storage area A, for example, when the size of free space in the storage area A has increased up to a predetermined threshold value that is sufficiently large to return the copy-once contents back to the storage area A.

On the other hand, if it is determined in step S22 that the size of the remaining free space of any storage area is greater than the predetermined threshold value, or if it is determined in step S24 that the content storage apparatus 1 is set such that even when the size of the remaining free size becomes low in a storage area, contents are not automatically saved from the storage area, the present process is ended.

Thus, the process described above allows a user to receive a notification warning that the size of free space remaining in a particular storage area has decreased to a low level. In response to the notification, the user may increase the free space.

Figure 7:
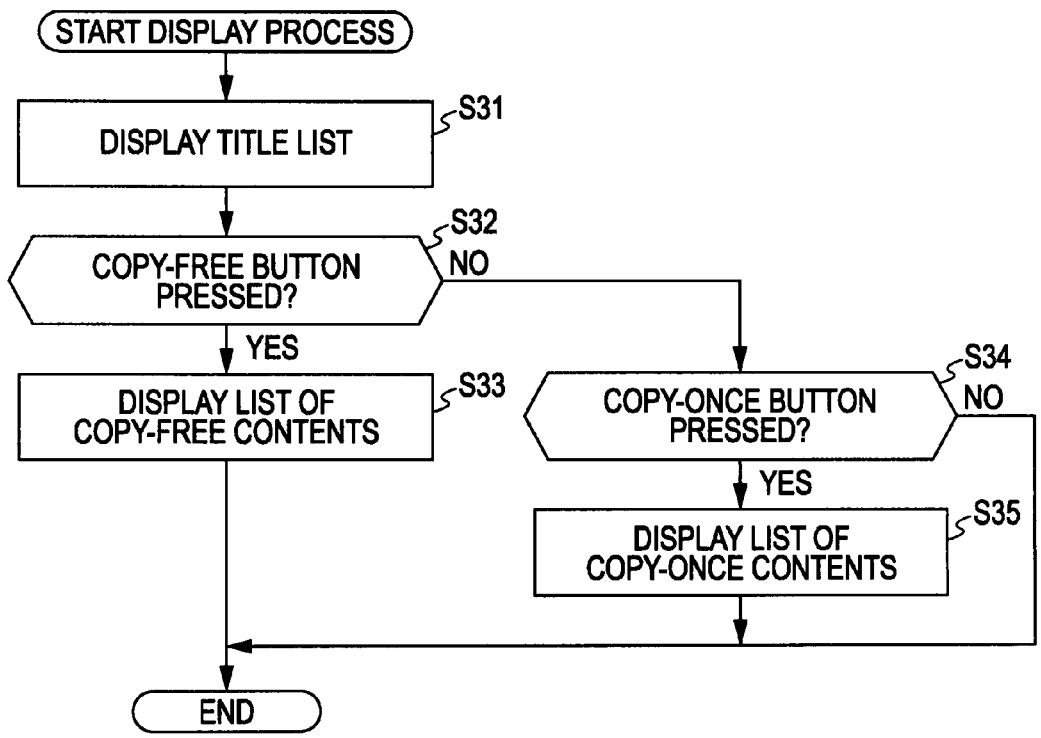
FIG. 7 is a flow chart illustrating a displaying process performed by a content storage apparatus according to an embodiment of the present invention.

Next, referring to a flow chart shown in FIG. 7, a process of displaying a title list, performed by the content storage apparatus 1, is described below.

If a command to display a title list is issued by a user, for example, by operating a remote control, then in step S31, the content manager 43 acquires information associated with contents stored in the HDD 15 and displays a title list on the TV 2 via the display controller 44. The title list displayed on the TV 2 includes titles of contents stored in the HDD 15 and associated information such as a date/time of storing each title.

Figure 8A:
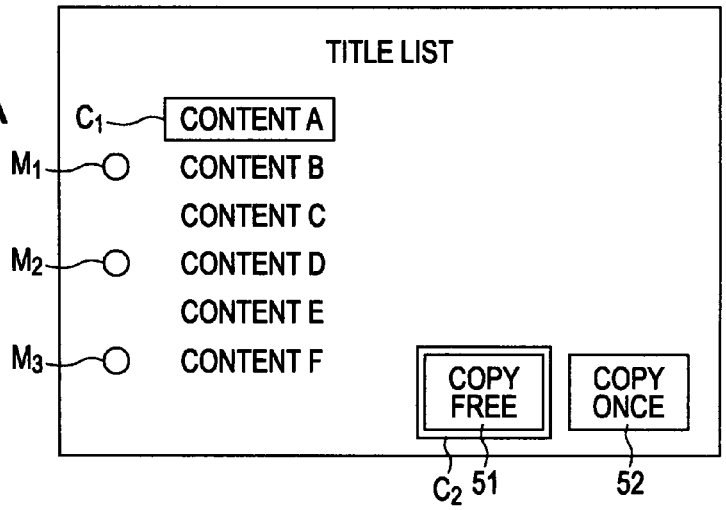
FIGS. 8A to 8C illustrate examples of displayed title lists.

FIG. 8A illustrates an example of a title list.

In the example shown in FIG. 8A, titles of contents A to F stored in the HDD 15 are displayed, and the content A is selected with a cursor $C_1$. A user is allowed to select a desired content with the cursor $C_1$ by pressing an up/down arrow key disposed on the remote control. The content selected by the cursor $C_1$ is played back or dubbed in accordance with an operation further performed on the remote control by the user.

In the example shown in FIG. 8A, marks $M_1$ to $M_3$ are displayed at locations to the left of the respective contents B, D, and F to indicate these contents are copy-once contents.

This makes it possible for a user to easily understand which contents are copy-once contents and which contents are copy-free contents, even when both types of contents are stored in the same HDD 15.

A particular mark may be displayed not to each copy-once content but to a copy-free content to distinguish between copy-once contents and copy-free contents. Instead, titles may be displayed in different colors so that difference in color makes it possible for the user to understand which contents are copy-once contents and which contents are copy-free contents.

When a particular content is selected with the cursor $C_1$, a message or an icon may be displayed at a predetermined location in the title list to indicate whether the selected content is a copy-once content or a copy-free content.

In the example shown in FIG. 8A, a copy-free button 51 and a copy-once button 52 are displayed in a right lower area of the title list, and the copy-free button 51 is selected with a cursor $C_2$. The user is allowed to select the copy-free button 51 or the copy-once button 52 by pressing a right/left key disposed on the remote control. When a button is selected by the cursor $C_2$, if a particular button on the remote control is pressed by the user, the button selected with the cursor $C_2$ is applied. If the copy-free button 51 is pressed, a list of copy-free contents is displayed. On the other hand, if the copy-once button 52 is pressed, a list of copy-once contents is displayed.

Referring again to FIG. 7, in step S32, the display controller 44 determines whether the copy-free button 51 on the title list screen has been pressed by the user. If so, the process proceeds to step S33. In step S33, the display controller 44 switches the screen to display a list of copy-free contents.

On the other hand, if it is determined in step S33 that the copy-free button 51 is not pressed by the user, the display controller 44 advances the process to step S34 to determine whether the copy-once button 52 is pressed.

If the display controller 44 determines in step S34 that the copy-once button 52 is pressed, the display controller 44 advances the process to step S35 to switch the displayed screen to display a list of copy-once contents.

After the specified title list is displayed in step S33 or S35, the process is ended. In a case where it is determined in step S34 that the copy-once button 52 is not pressed, the process is also ended.

Figure 8B:
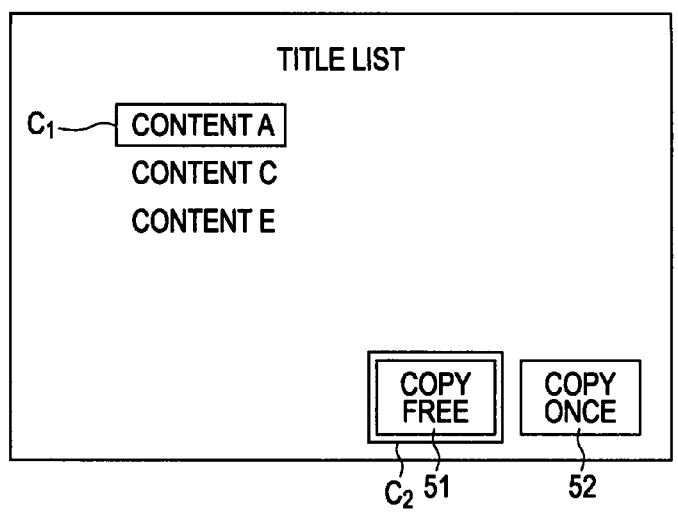
Figure 8C:
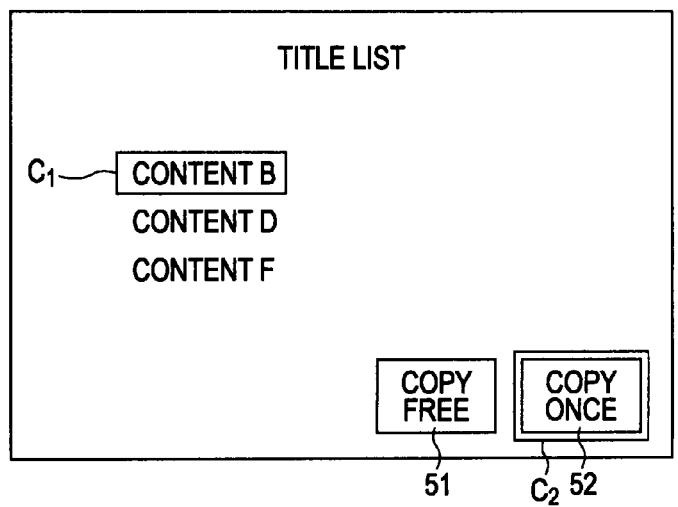

FIG. 8B illustrates an example of a title list displayed when the copy-free button 51 is pressed, and FIG. 8C illustrates an example of a title list displayed when the copy-once button 52 is pressed.

In the example shown in FIG. 8B, contents A, C, and E are displayed in a title list of copy-free contents. In the example shown in FIG. 8C, contents B, D, and F are displayed in a title list of copy-once contents.

As described above, the user is allowed to switch the displayed title list by pressing the copy-free button 51 or the copy-once button 52, and the user can easily view copy-free contents or copy-once contents in the displayed title list.

A button may be displayed for use to display a list of contents stored in a particular storage area. For example, a button may be displayed for use to display a list of contents (copy-once contents) stored in the storage area A, and a button may be displayed for use to display a list of contents (copy-once contents and copy-free contents) stored in the storage area B.

Figure 9:
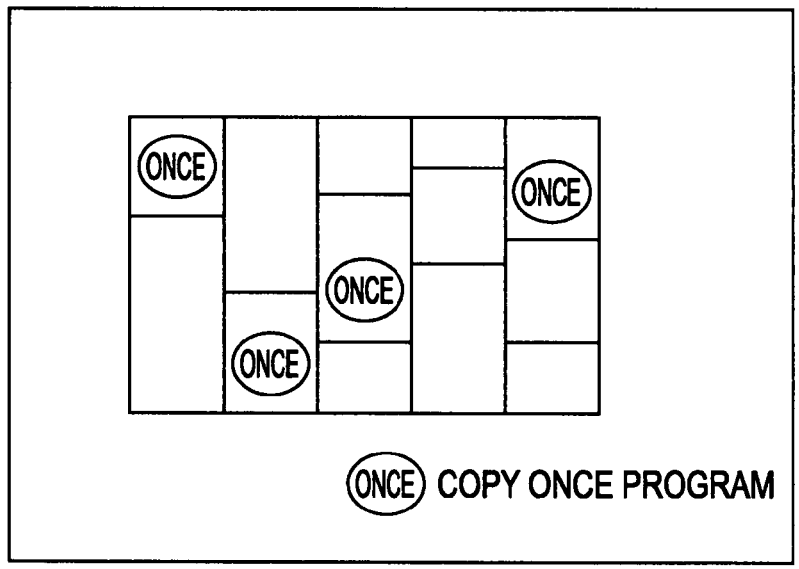
FIG. 9 is a diagram illustrating an example of a displayed program table.

FIG. 9 illustrates an example of a broadcast program table.

In the example shown in FIG. 9, a mark (icon) is displayed in a box to indicate that a content displayed in this box is a copy-once content. This makes it possible for a user to easily understand which contents of those displayed in the broadcast program table are copy-once contents.

Figure 10:
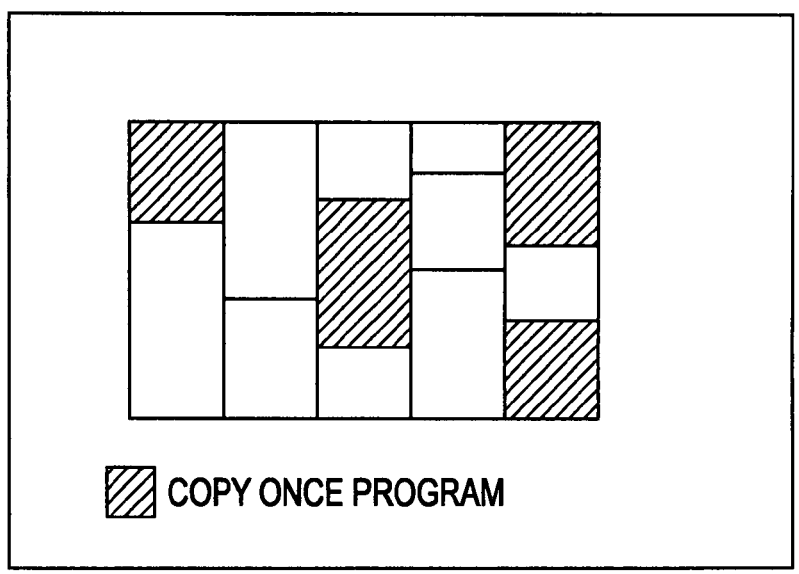
FIG. 10 is a diagram illustrating an example of a displayed program table.

Alternatively, a mark indicating a content other than copy-once contents may be displayed to distinguish content types. As in an examples shown in FIG. 10, copy-once contents may be displayed in a color different from a color of contents other than copy-once contents to allow a user to understand restrictions on respective contents.

Figures 11, 12, 13:
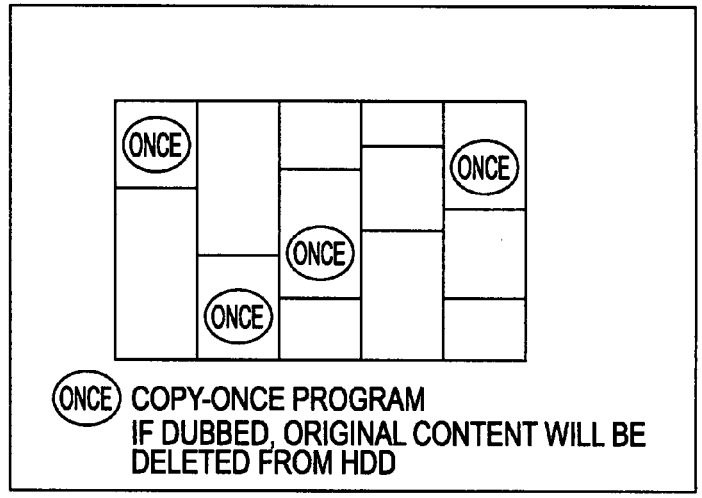
FIG. 11 is a diagram illustrating an example of a displayed program table including icons indicating copy-once programs and a message associated with copy once programs.
FIG. 12 is a diagram illustrating an example of displayed list of contents programmed to be recorded.
FIG. 13 is a diagram illustrating an example of a list of contents displayed for use by a user to select contents to be dubbed to another storage medium.

When the user selects a particular one of contents, if the selected content is a copy-once content, then a text message or an icon may be displayed at a particular location to provide information associated with the selected content as shown in FIG. 11.

The broadcast program table displayed in the above-described manner allows the user to easily select, for example, a copy-once content that will be retained after it is moved to another storage medium.

The above-described methods to distinguish content types may be applied to a list of contents programmed to be automatically recorded as shown in FIG. 12 or a list for section of contents to be dubbed as shown in FIG. 13.

Next, referring to a flow chart shown in FIG. 14, described below is a process performed by the content storage apparatus 1 to dub a content stored in the HDD 15.

The contents stored in the HDD 15 include contents, such as those stored in the storage area B, which will be deleted if they are moved to another storage medium. When the user issues a command to move such a content, the content storage apparatus 1 displays a message to warn the user that if a content is moved, the original content will be deleted.

In some cases, a content is moved to the memory card 5B or a similar storage medium in a format with a lower resolution than the resolution of the original content stored in the HDD 15. When the user specifies to move a content into such a form, the content storage apparatus 1 displays a message to warn the user that the content will be moved in a format with a lower resolution than the resolution of the original content.

Figure 14:
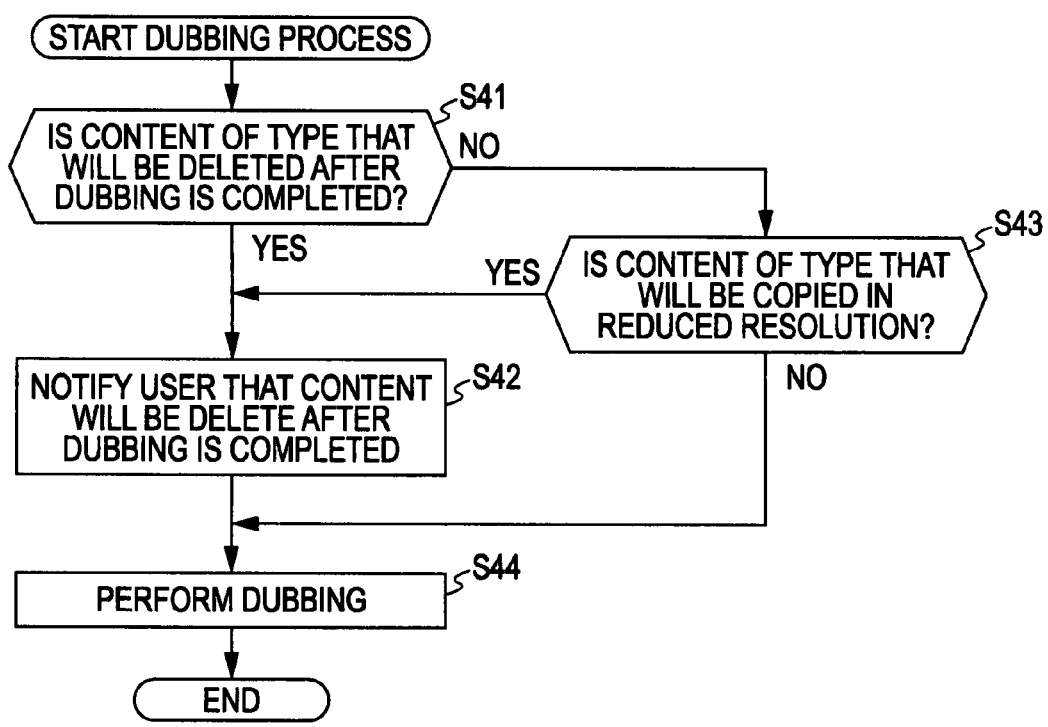
FIG. 14 is a flow chart illustrating a dubbing process performed by a content storage apparatus according to an embodiment of the present invention.

The process shown in FIG. 14 is started, for example, when a content is selected from a title list, and a command is issued to dub the selected content.

In step S41, the content manager 43 determines whether the content specified to be dubbed is a content the original data of which will be deleted when the content is moved. If so, the process proceeds to step S42.

In step S42, the content manager 43 provides a notification to a user to warn that if the content is moved, the original content will be deleted. The notification is provided in the form of a message displayed on the display screen or provided via voice or e-mail, as with the notification of the capacity of the HDD 15 described above.

On the other hand, in a case where the content manager 43 determines in step S41 that the content specified to be dubbed is not a content the original data of which will be deleted when the content is moved, the content manager 43 advances the process to step S43.

In step S43, the content manager 43 determines whether the content specified to be dubbed will be moved in a format with a resolution lower than the original resolution of the content stored in the HDD 15. If so, then in step S42, the content manager 43 provides a notification to the user to warn that the resolution will be reduced when the content is moved.

The process proceeds to step S44 after the notification is provided to the user in step S42. In a case where it is determined in step S43 that the content specified to be dubbed is not a content whose resolution will be reduced when the content is moved, the process proceeds to step S44.

In step S44, the content manager 43 reads the content specified to be dubbed, from the HDD 15, and stores the content in a removable storage medium 5 specified as the dubbing destination. In a case where a copy-once content stored in the storage area B is moved, the content manager 43 deletes the original content from the storage area B, as required.

In the above explanation, it is assumed that storing of copy-once contents in the storage area A is restricted according to the total data size of copy-once contents (FIG. 3). Alternatively, storing of copy-once contents in the storage area A may be restricted according to the total number of copy-once contents.

For example, when the maximum number of copy-once contents allowed to be stored in the storage area A is set, for example, to 50 contents, it is allowed to store up to 50 copy-once contents in the storage area.

Figure 15:
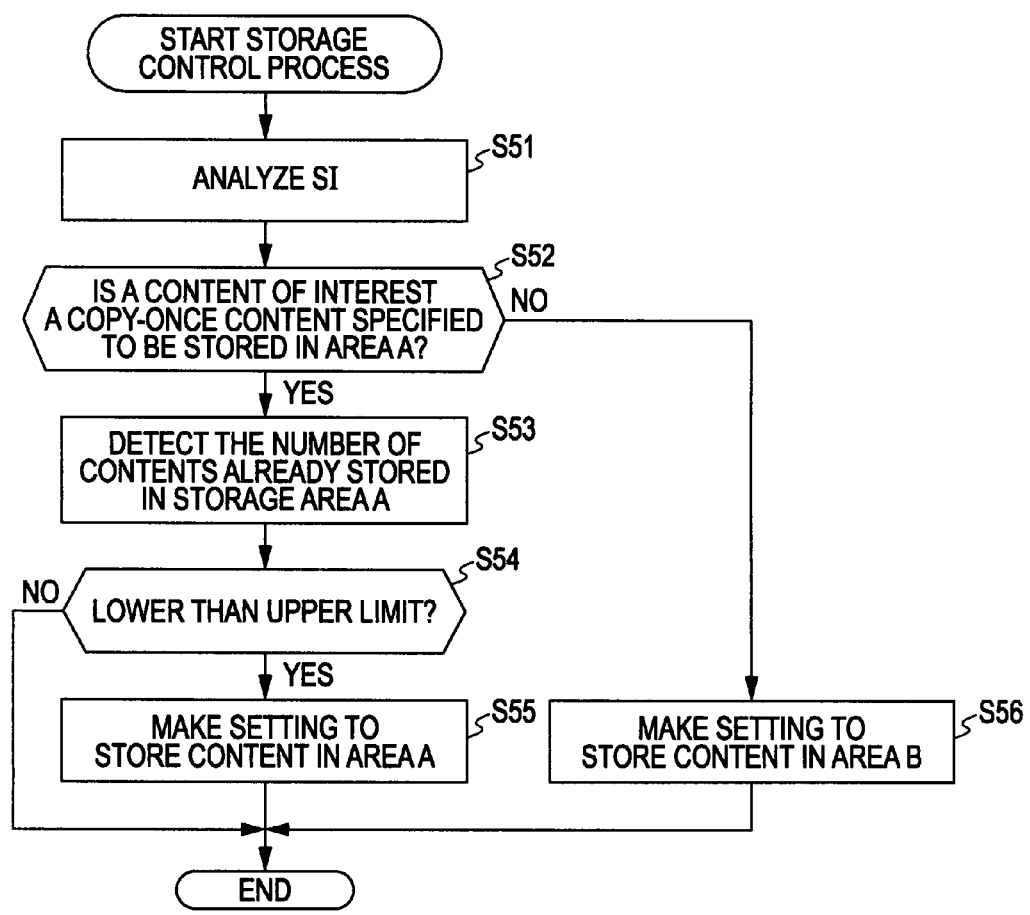
FIG. 15 is a flow chart illustrating a storage control process performed by a content storage apparatus according to an embodiment of the present invention.

Now, referring to a flow chart shown in FIG. 15, described below is a process performed by the content storage apparatus 1 to control storing of copy-once contents in the storage area A according to the number of contents.

This process is performed, for example, when setting is made to automatically store a broadcast program content, as with the process shown in FIG. 3. If a user selects a content to be stored from a broadcast program table or the like, SI associated with the selected content is extracted by the DEMUX 12 and sent to the SI analyzer 41.

In step S51, the SI analyzer 41 analyzes the SI and extracts CCI associated with the content specified to be stored. The resultant CCI is supplied to the storage controller 42.

In step S52, in accordance with the CCI supplied from the SI analyzer 41 and the setting made by a user or the default setting, the storage controller 42 determines whether the content to be stored is a copy-once content specified to be stored in the storage area A of the HDD 15.

If the storage controller 42 determines in step S52, that the content to be stored is a copy-once content requested to be stored in the storage area A of the HDD 15, the process proceeds to step S53. In step S53, the storage controller 42 accesses the HDD 15 to detect the total number of contents already stored in the storage area A.

In step S54, the storage controller 42 determines whether the result of checking in step S53 indicates that the number of copy-once contents already stored in the storage area A is smaller than the predefined maximum allowable number.

If the storage controller 42 determines in step S54 that the number of copy-once contents already stored in the storage area A is smaller than the predefined maximum allowable number, the storage controller 42 advances the process to step S55. In step S55, the storage controller 42 sets the automatic recording programming such that the copy-once content of interest will be stored in the storage area A, and, thereafter, the storage controller 42 ends the present process. When broadcasting of the copy-once content specified to be stored is started, the switch 31 of the switching circuit 13 is connected to the terminal 32A, and the received copy-once content is stored in the storage area A.

On the other hand, in a case where the storage controller 42 determines in step S54 that the number of copy-once contents already stored in the storage area A has already reached the predefined maximum allowable number, the storage controller 42 skips step S55 and ends the present process. In this case, the storage controller 42 may set the automatic recording programming such that the copy-once content of interest will be stored in the storage area B when the copy-once content is broadcast.

In a case where the storage controller 42 determines in step S52 that the analysis on the basis of the CCI supplied from the SI analyzer 41 and the setting made by the user or the default setting indicates that the content of interest is not a copy-once content specified to be stored in the storage area A of the HDD 15, that is, the storage controller 42 determines that the content of interest is a copy-once content specified to be stored in the storage area B of the HDD 15 or the content of interest is a copy-free content, the storage controller 42 advances the process to step S56.

In step S56, the storage controller 42 sets the automatic recording programming such that the content of interest will be stored in the storage area B, and, thereafter, the storage controller 42 ends the present process. When broadcasting of the content of interest is started, the switch 31 of the switching circuit 13 is connected to the terminal 32B, and the received content is stored in the storage area B. Note that when the storage area B is specified as a storage area in which to store a content, checking is also performed, as required, to determine the number of contents already stored in the storage area B.

The manner of restricting the operation of storing copy-once contents in the storage area A depending on the number of content already stored in the storage area A has been described above.

Also in the case where storing of copy-once contents in the storage area A is restricted according to the total number of copy-once contents already stored therein, as in the case described above with reference to FIG. 4, a circular chart or a bar chart may be displayed in response to a request from the user to indicate the number of contents allowed to be further stored in the storage area A so that the user can visually understand the remaining storage space. When the number of contents allowed to be further stored in the storage area A becomes less than a predetermined threshold value, this fact may be notified to the user via a UI screen, voice, or e-mail, in a similar manner to the process described above with reference to FIG. 5. When the number of contents allowed to be further stored in the storage area A becomes less than the predetermined threshold value, contents stored in the storage area A may be automatically saved into the external storage medium 4 or the removable storage medium 5.

In the above-described explanation, it is assumed that the determination as to whether a content should be stored in the storage area A or B of the HDD 15 is made according to the SI, the playback control information, DRM (Digital Rights Management) information, and the setting made by the user or the default settings. Alternatively, when copy-once contents include two types, one of which is allowed to remain in the HDD 15 after moving is performed, and the other one of which is to be deleted from the HDD 15 after moving is performed, if SI indicates the type of a content of interest, then the determination as to the storage area in which to store a content may be made according to only SI, the playback control information, and DRM (Digital Rights Management) information. More specifically, if SI indicates that the copy-once content of interest is of the former type, then the storage area A is specified as a storage area in which to store the copy-once content of interest, while if SI indicates that the copy-once content of interest is of the latter type, then the storage area B is specified as a storage area in which to store the copy-once content of interest.

The above discussion is focused on the control of the storage destination of copy-once contents. The technique described above may also be used to control the storing operation of contents allowed to be copied up to N times. When a content set to be allowed to be copied up to N times is stored in the storage area A, if this content is copied to a removable storage medium N times, the content is moved from the storage area A to the storage area B, and playback of this content is disabled although the content remains in the HDD 15. If the content is moved back from the removable storage medium, the content is treated again as a content residing in the storage area A. If the moving back is performed m times ($m \leqq N$), the content is treated as a content allowed to be copied m times.

The storage area in which to store a content may be determined according to a category of the content indicated by SI. For example, a copy-once content of news may be stored in the storage area A, while a copy-once content of movie may be stored in the storage area B.

The correspondence between the category indicated by SI and the storage area in which to store contents may be predefined in the storage controller 42 or may be defined by a user. Alternatively, the correspondence may be defined in accordance with information received from a particular server via the network 3 or broadcast information.

In the embodiments described above, storage areas have been partitioned in advance. Alternatively, storage areas may be partitions in accordance with SI or in accordance with information received from a particular server via the network 3 or broadcast information.

In the embodiment described above, copy-once contents are managed such that entities of all copy-once contents are placed in the storage area B, and clones of copy-once contents that are allowed to be copied without being deleted are also stored in the storage area A. This management technique is discussed in further detail below.

Figure 16:
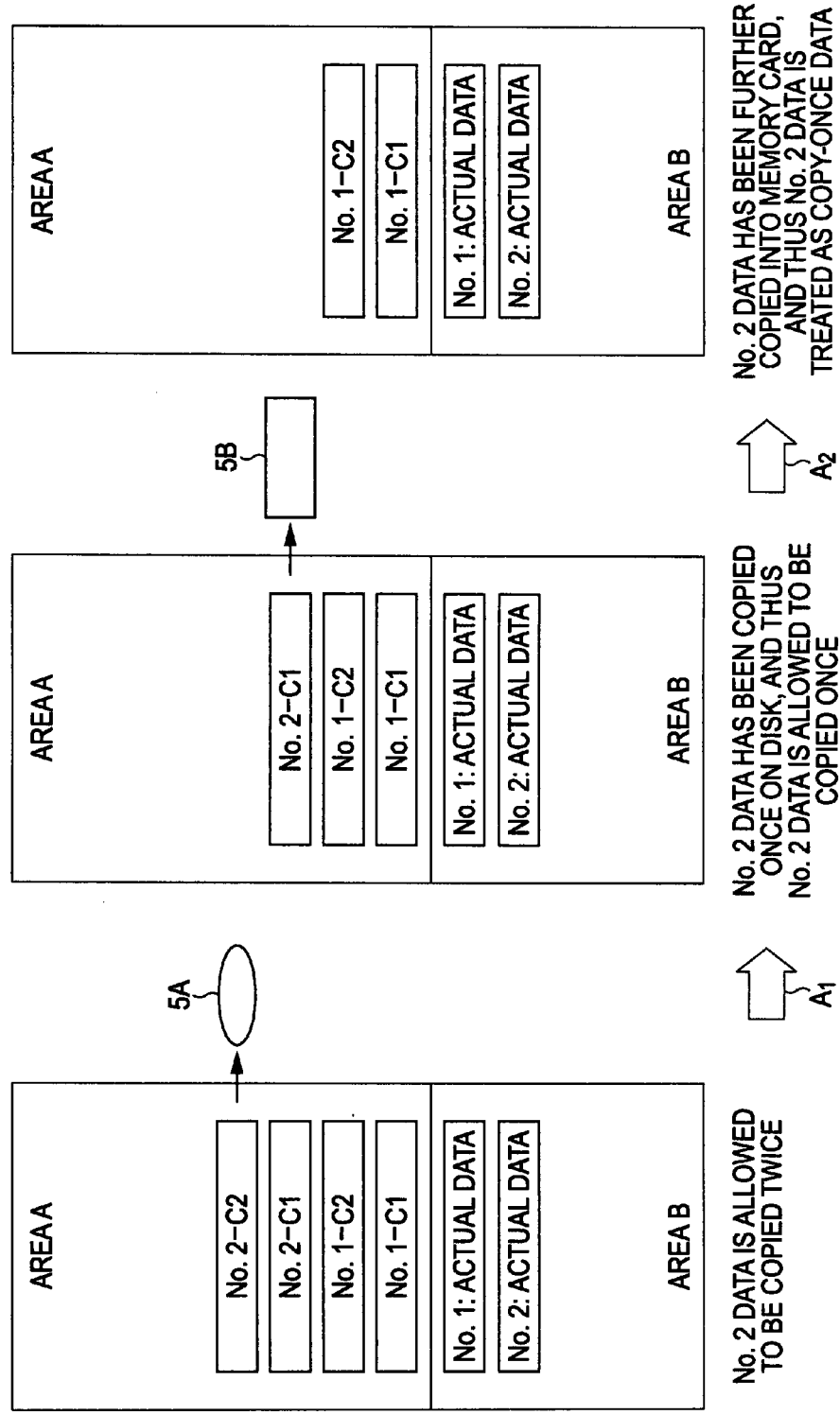
FIG. 16 illustrates an example of a manner of storing a copy-once content.

FIG. 16 illustrates an example of a manner in which entities and clones are stored in the storage area B and the storage area A according to CCI.

When a copy-once content #1 and a copy-once content #2 are received, entities of these respective contents are stored in the storage area B. If these copy-once contents #1 and #2 are both contents defined as allowed to be copied twice, two clones of the copy-once content #1 and two clones of the copy-once content #2 are stored in the storage area A when the entities are stored in the storage area B. In FIG. 16, "No. 1-C1" and "No. 1-C2" denote clones of the copy-once content #1, and "No. 2-C1" and "No. 2-C2" denote clones of the copy-once content #2.

In this state, for example, if the copy-once content #2 is copied to a Blu-ray disk 5A, the clone "No. 2-C2" of the copy-once content #2 is deleted from the storage area A as represented by an open arrow $A_1$. As a result, the copy-once content #2 comes in a state in which copying is allowed once more.

Subsequently, for example, if the copy-once content #2 is copied to a memory card 5B, the clone "No. 2-C1" of the copy-once content #2 is deleted from the storage area A as represented by an open arrow $A_2$. As a result, the copy-once content #2 comes in a state in which no further copying is allowed, and a user is allowed to treat the entity of the copy-once content #2 remaining in the storage area B as a usual copy-once content. That is, the user is not allowed to further copy the copy-once content #2, although the user is allowed to move the copy the copy-once content #2.

Figure 17:
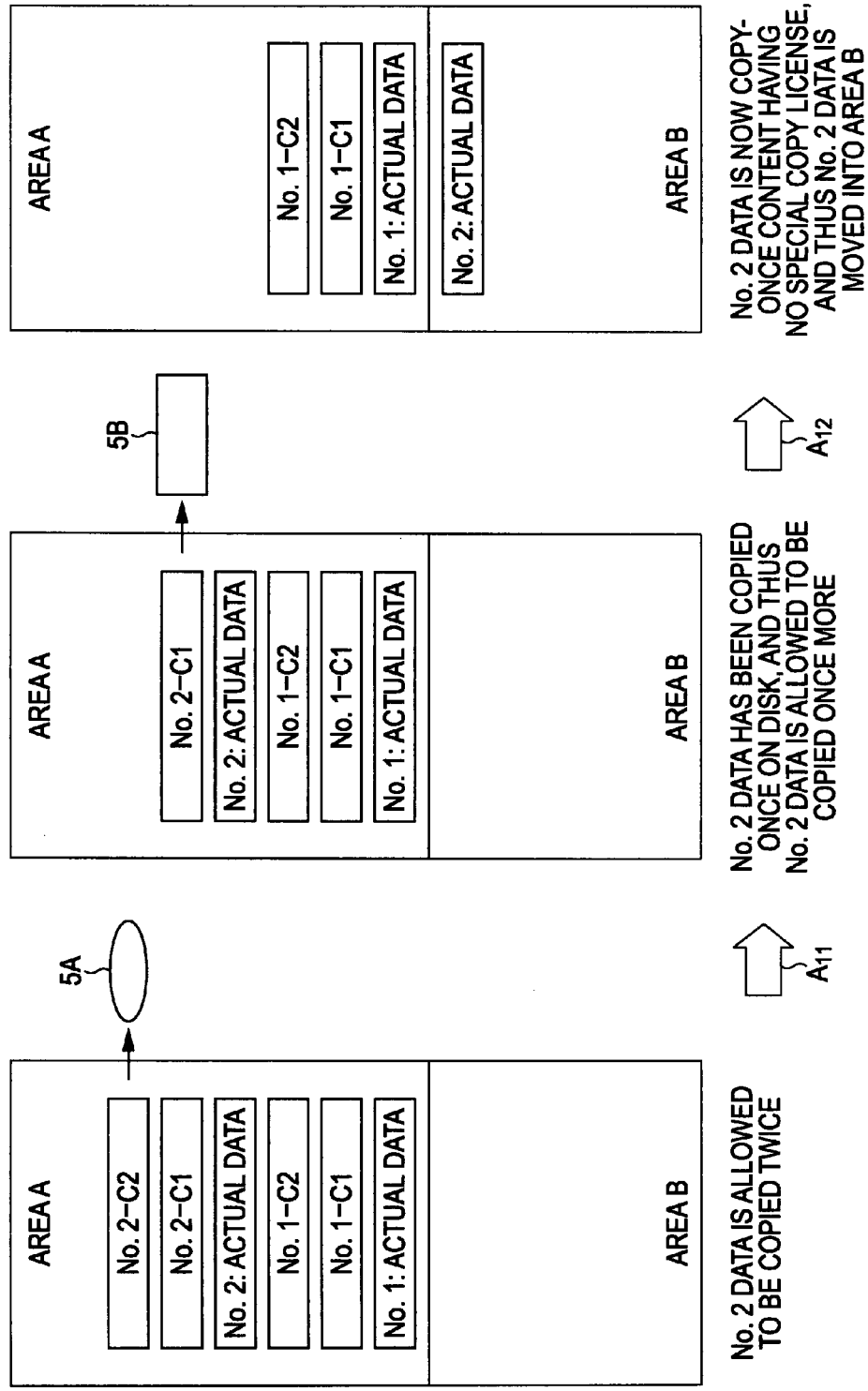
FIG. 17 illustrates an example of a manner of storing a copy-once content.

FIG. 17 illustrates another example of a manner in which entities and clones are stored in the storage area B and the storage area A. In this example, when a copy-once content comes in a state in which no further copying is allowed, the copy-once content is moved from the storage area A to the storage area B. Thereafter, this copy-once content is managed as a usual content stored in the storage area B.

In this case, when a copy-once content #1 and a copy-once content #2 are received, if these copy-once contents #1 and #2 are both contents defined as allowed to be copied twice, clones "No. 1-C1" and "No. 1-C2" of the copy-once content #1 and clones "No. 2-C1" and "No. 2-C2" of the copy-once content #2 are stored in the storage area A are stored together with their entities in the storage area A.

In this state, for example, if the copy-once content #2 is copied to a Blu-ray disk 5A, the clone "No. 2-C2" of the copy-once content #2 is deleted from the storage area A as represented by an open arrow $A_{11}$. As a result, the copy-once content #2 comes in a state in which copying is allowed once more.

Subsequently, for example, if the copy-once content #2 is copied to a memory card 5B, the clone "No. 2-C1" of the copy-once content #2 is deleted from the storage area A as represented by an open arrow $A_{12}$. As a result, the copy-once content #2 comes in a state in which no further copying is allowed. The entity of the copy-once content #2, which has come in the state in which no further copying is allowed, is moved into the storage area B. In this state, the user is allowed to treat the copy-once content #2 stored in the storage area B as a usual copy-once content. That is, the user is not allowed to further copy the copy-once content #2, although the user is allowed to move the copy the copy-once content #2.

In the embodiment described above, when a content is stored in the HDD 15, the storage area in which to store the content is switched in accordance with the result of analysis of SI and in accordance with the settings made by a user or the default settings. Alternatively, the storage area in which to store the content may be switched in accordance with the format of the content.

Figure 18:
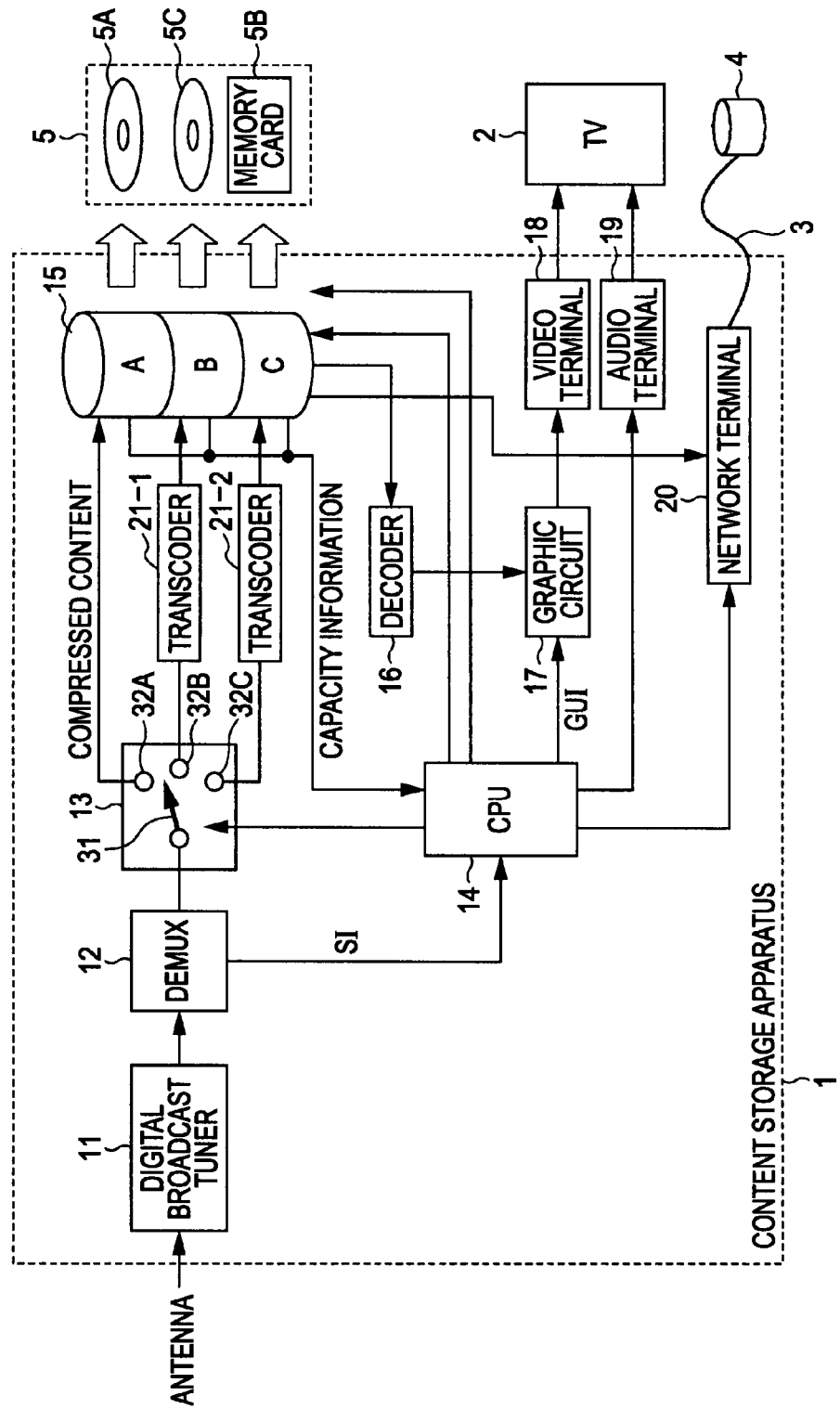
FIG. 18 is a block diagram illustrating an example of a configuration of a content storage apparatus according to an embodiment of the present invention.

FIG. 18 is a block diagram illustrating another example of a configuration of the content storage apparatus 1. In FIG. 18, similar parts to those in FIG. 1 are denoted by similar reference numerals.

The content storage apparatus 1 shown in FIG. 18 is different from that shown in FIG. 1 in that the switching circuit 13 includes a terminal 32C in addition to terminals 32A and 32B, the switch 31 is configured to be connected to one of terminals 32A to 32C, the HDD 15 has a storage area C in addition to storage areas A and B, and transcoders 21-1 and 21-2 are disposed between the switching circuit 13 and the HDD 15. The other parts are similar to corresponding parts of the content storage apparatus 1 shown in FIG. 1.

In the example shown in FIG. 18, removable storage media mountable on the content storage apparatus 1 include a DVD 5C in addition to a Blu-ray disk 5A and a memory card 5B.

In the content storage apparatus 1 shown in FIG. 18, under the control of the CPU 14, a digital broadcast tuner 11 receives a broadcast signal via an antenna (not shown in FIG. 18), demodulates the received broadcast signal, and outputs a transport stream broadcast in a particular channel to a demultiplexer (DEMUX) 12.

Under the control of the CPU 14, the DEMUX 12 extracts a particular stream from the transport stream and supplies the extracted stream, as a content to be stored, to a switching circuit 13. The DEMUX 12 extracts SI from the transport stream and supplies it to the CPU 14.

Under the control of the CPU 14, the switching circuit 13 connects a switch 31 to one of the terminals 32A, 32B, and 32C so that the content received from the DEMUX 12 is output from the connected terminal. In a state in which the switch 31 is connected to the terminal 32A, the content output from the switching circuit 13 is stored in the storage area A of the HDD 15. On the other hand, in a state in which the switch 31 is connected to the terminal 32B, the content output from the switching circuit 13 is supplied to the transcoder 21-1. When the switch 31 is connected to the terminal 32C, the content output from the switching circuit 13 is supplied to the transcoder 21-2.

The CPU 14 controls the operation over the whole content storage apparatus 1. More specifically, for example, the CPU 14 analyzes SI supplied from the DEMUX 12 and determines one of the storage areas in the HDD 15 as a storage area into which to store a content of interest, in accordance with the result of the analysis of the SI and in accordance with the type of the removable storage medium 5 specified as a final dubbing destination.

The final dubbing destination may be specified by a user when the automatic recording setting is made. Alternatively, the final dubbing destination may be determined in advance by default, for example, such that contents with HD (High Definition) are dubbed to the Blu-ray disk 5A, and contents with SD (Standard Definition) are dubbed to the memory card 5B or the DVD 5C.

If the CPU 14 determines that a content of interest is set to be finally dubbed to the Blu-ray disk 5A after the content of interest is stored in the HDD 15, then the CPU 14 controls the switching circuit 13 such that the switch 31 is connected to the terminal 32A so that the content output from the DEMUX 12 is stored in the storage area A of the HDD 15.

If the CPU 14 determines that the content of interest is set to be finally dubbed to the DVD 5C after the content of interest is stored in the HDD 15, then the CPU 14 controls the switching circuit 13 such that the switch 31 is connected to the terminal 32B so that the content output from the DEMUX 12 is supplied to the transcoder 21-1.

If the CPU 14 determines that the content of interest is set to be finally dubbed to the memory card 5B, after the content of interest is stored in the HDD 15, then the CPU 14 controls the switching circuit 13 such that the switch 31 is connected to the terminal 32C so that the content output from the DEMUX 12 is supplied to the transcoder 21-2.

The CPU 14 acquires, from the HDD 15, capacity information associated with the capacity of each storage area of the HDD 15, and notifies the user of the storage capacity. More specifically, for example, the CPU 14 provides a graphic or audio notification indicating the relative storage space of each storage area already used to store content with respect to the total storage space. When the remaining free space available for storing contents has become small, the CPU 14 provides a notification, in a graphical or audio form, of the fact that there is no sufficient remaining free space.

The CPU 14 also controls an operation of dubbing a content stored in the HDD 15 to a removable storage medium 5. When a content stored in the HDD 15 is dubbed to a removable storage medium 5, the CPU 14 controls the dubbing operation not only in accordance with the restriction on the dubbing defined by the SI supplied from the DEMUX 12 and also in accordance with the restriction defined depending on the type of the removable storage medium 5 specified as the dubbing destination.

The control of the dubbing operation by the CPU 14 will be described in further detail later. Also in the content storage apparatus 1 shown in FIG. 18 according to the present embodiment, functions similar to those shown in FIG. 2 are implemented by executing a program on the CPU 14, and thus FIG. 2 will also be referred to as required in the following explanation.

The HDD 15 has a storage area A, a storage area B, and a storage area C formed in a total storage area of the HDD 15. The storage areas A and B may be physically or logically partitioned. The storage area A is used to store contents supplied from the switching circuit 13. The storage area B is used to store contents supplied from the transcoder 21-1. The storage area C is used to store contents supplied from the transcoder 21-2.

If the transcoder 21-1 receives a content output from the switching circuit 13, the transcoder 21-1 converts the received content into a content in a format different from a format of contents stored in the storage area A and also different the format of contents stored in the storage area C. Similarly, if the transcoder 21-2 receives a content output from the switching circuit 13, the transcoder 21-2 converts the received content into a content in a format different from a format of contents stored in the storage area A and also different the format of contents stored in the storage area B.

That is, formats of contents are different depending on whether contents are stored in the storage area A, the storage area B, or the storage area C of the HDD 15.

More specifically, for example, contents stored in the storage area A assigned the Blu-ray disk 5A as the final dubbing destination are in a format such as MPEG-2 (HD), MPEG-4 AVC High Profile, VC-1, etc. assigned to the Blu-ray disk 5A. Contents stored in the storage area B assigned the DVD 5C as the final dubbing destination are in a format such as MPEG-2 (SD) or the like assigned to the DVD 5C. Contents stored in the storage area C assigned the memory card 5B as the final dubbing destination are in a format such as H.264/MPEG-4 AVC (with a resolution lower than the resolution of MPEG-4 AVC High Profile) or the like assigned to the memory card 5B.

The contents stored in the storage area A are dubbed, as required, to the Blu-ray disk 5A assigned as the removable storage medium 5 to the storage area A. The contents stored in the storage area B are dubbed, as required, to the DVD 5C assigned as the removable storage medium 5 to the storage area B. The contents stored in the storage area C are dubbed, as required, to the memory card 5B assigned as the removable storage medium 5 to the storage area C.

The decoder 16 decodes video data supplied from the HDD 15 and supplies the resultant video data to the graphic circuit 17.

In accordance with GUI data supplied from the CPU 14, the graphic circuit 17 produces data graphically indicating the ratio of the size of storage space occupied by contents already stored in a storage area to the total size of storage space of the storage area, and the graphic circuit 17 displays the resultant graphical image on the TV 2 via a video terminal 18. On the basis of the vide data supplied from the decoder 16, the graphic circuit 17 displays an image of a stored content on the TV 2 via the video terminal 18.

The video terminal 18 displays various images on the TV 2 in accordance with data supplied from the graphic circuit 17.

The audio terminal 19 outputs various voices/sounds via a speaker of the TV 2 in accordance with data supplied from the CPU 14. For example, voice information indicating the capacity of the HDD 15 or the like is output from the TV 2.

Under the control of the CPU 14, the network terminal 20 reads a content stored in the HDD 15 and stores the read content in the external storage medium 4.

If the transcoder 21-1 receives a content from the switching circuit 13 in a state in which the switch 31 is connected to the terminal 32B, the transcoder 21-1 converts the received content into a format such as MPEG-2 different from the formats assigned to the respective storage formats An and C, and the transcoder 21-1 stores the resultant content in this format in the storage area B of the HDD 15.

If the transcoder 21-2 receives a content from the switching circuit 13 in a state in which the switch 31 is connected to the terminal 32C, the transcoder 21-2 converts the received content into a format such as H.264/MPEG-4 AVC different from the formats assigned to the respective storage formats An and B. The resultant content in this format is stored in the storage area C of the HDD 15.

In addition to the conversion of the formation, the transcoders 21-1 and 21-2 may also perform a conversion of the transfer rate to reduce the image quality.

As described above, the content storage apparatus 1 shown in FIG. 18 switches the storage area for storing a content of interest depending on the format assigned to the removable storage medium 5 specified as the final dubbing destination.

There are restrictions on dubbing performed by the content storage apparatus 1 shown in FIG. 18, as described below. As described above, the CPU 14 shown in FIG. 18 controls the dubbing operation not only in accordance with the restriction on the dubbing defined by the SI supplied from the DEMUX 12 and also in accordance with the restriction defined depending on the type of the removable storage medium 5 specified as the dubbing destination.

FIG. 19 illustrates an example of a restriction on copying defined depending on the type of the removable storage medium 5 specified as a storage medium for copying a content of interest.

In the example shown in FIG. 19, when a content stored in the HDD 15 is copied to a Blu-ray disk 5A, copying is allowed up to 5 times. When a content stored in the HDD 15 is copied to a DVD 5C, copying is allowed up to 50 times. On the other hand, when a content stored in the HDD 15 is copied to a memory card 5B, copying is allowed up to 100 times.

The restriction on the maximum number of times a content is copied to a removable storage medium 5 may be predefined or may be defined or updated in accordance with information received from a particular server via the network 3 or broadcast information.

FIG. 20 illustrates an example of a restriction on copying defined depending on the type of a content to be copied.

In the example shown in FIG. 20, the maximum number of times a content is allowed to be copied is defined depending on the content category. More specifically, for example, a content A of movie is allowed to be copied only once. A content B of news is allowed to be copied up to 100 times, and a content C of drama is allowed to be copied up to 10 times.

The restriction on the number of times a content is copied is expressed in SI extracted by the DEMUX 12. The restriction on the number of copying operations for a content provided by VOD is defined in playback control information or DRM (Digital Rights Management) information transmitted via the network 3.

FIG. 21 illustrates an example of a restriction on the number of copying operations, defined for each type of the removable storage medium 5 and for each content category.

Basically, when a content is copied to a removable storage medium 5, the number of times the content is copied is limited to the smallest value of the value defined for the content category and the value defined for the type of the removable storage medium 5.

In the example shown in FIG. 21, when the content A of movie is copied to a Blu-ray disk 5A, the number of times the content A is copied is limited to the smallest value of the value defined for the content A, that is, 1 time, and the value defined for the Blu-ray disk 5A, that is, 5 time, and thus the number of times the content is copied is limited to 1 time, in this case. When the content A of movie is copied to a DVD 5C, the number of times the content A is copied is limited to the smallest value of the value defined for the content A, that is, 1 time, and the value defined for the DVD 5C, that is, 50 time, and thus the number of times the content is copied is limited to 1 time, in this case. When the content A of movie is copied to a memory card 5B, the number of times the content A is copied is limited to the smallest value of the value defined for the content A, that is, 1 time, and the value defined for the memory card 5B, that is, 100 time, and thus the number of times the content is copied is limited to 1 time, in this case.

In a case where the content B of news is copied to a Blu-ray disk 5A, the number of times the content B is copied is limited to the smallest value of the value defined for the content B, that is, 100 times, and the value defined for the Blu-ray disk 5A, that is, 5 time, and thus the number of times the content is copied is limited to 5 time, in this case. When the content B of news is copied to a DVD 5C, the number of times the content B is copied is limited to the smallest value of the value defined for the content B, that is, 100 times, and the value defined for the DVD 5C, that is, 50 time, and thus the number of times the content is copied is limited to 50 time, in this case. When the content B of news is copied to a memory card 5B, the number of times the content B is copied is limited to the smallest value of the value defined for the content B, that is, 100 times, and the value defined for the memory card 5B, that is, 100 time, and thus the number of times the content is copied is limited to 100 time, in this case.

In a case where the content C of drama is copied to a Blu-ray disk 5A, the number of times the content C is copied is limited to the smallest value of the value defined for the content C, that is, 10 times, and the value defined for the Blu-ray disk 5A, that is, 5 time, and thus the number of times the content is copied is limited to 5 time, in this case. When the content C of drama is copied to a DVD 5C, the number of times the content C is copied is limited to the smallest value of the value defined for the content C, that is, 10 times, and the value defined for the DVD 5C, that is, 50 time, and thus the number of times the content is copied is limited to 5 time, in this case. When the content C of drama is copied to a memory card 5B, the number of times the content C is copied is limited to the smallest value of the value defined for the content C, that is, 10 times, and the value defined for the memory card 5B, that is, 100 time, and thus the number of times the content is copied is limited to 5 time, in this case.

The restriction on the maximum allowable number of copying operations, such as that shown in FIG. 21, may be included in a title list displayed on the TV 2, for example, in such a manner as shown in FIG. 22 or may be notified to a user via voice output from the TV 2. Alternatively, the restriction on the maximum allowable number of copying operations may be notified to a user via e-mail output from the network terminal 20. The notification may be provided when the maximum allowable number of copying operations managed by the CPU 14 is updated in accordance with information supplied from a particular server via the network 3 or broadcast information.

Now, referring to a flow chart shown in FIG. 23, described below is a process performed by the content storage apparatus 1 shown in FIG. 18 to control the content storage operation. Also in the content storage apparatus 1 shown in FIG. 18, contents stored in each storage area of the HDD 15 are restricted according to the total data size of contents already stored.

The process is performed, for example, when setting is made to automatically store a broadcast program content. In the automatic recording setting process, after a content to be stored is specified, a removable storage medium 5 used as a final dubbing destination is specified by a user. When a removable storage medium 5 is specified as the final dubbing destination by the user, information indicating the specified removable storage medium 5 is supplied to the storage controller 42 (FIG. 2).

In step S101, the storage controller 42 receives information indicating the removable storage medium 5 specified as the final dubbing destination. In next step S102, the storage controller 42 determines whether the content to be stored is a content specified to be finally dubbed to a Blu-ray disk 5A.

If the storage controller 42 determines in step S102 that the content to be stored is a content specified to be finally dubbed to a Blu-ray disk 5A, then the storage controller 42 advances the process to step S103. In step S103, the storage controller 42 accesses the HDD 15 to detect the total data size of contents already stored in the storage area A.

In step S104, the storage controller 42 determines whether the result of checking in step S103 indicates that the storage area A has an enough free storage space to store the content specified to be stored.

If the storage controller 42 determines in step S104 that the storage area A has an enough free storage space to store the content specified to be stored, the storage controller 42 advances the process to step S105. In step S105, the storage controller 42 sets the automatic recording programming such that the content of interest will be stored in the storage area A, and, thereafter, the storage controller 42 ends the present process. When broadcasting of the content of interest is started, the switch 31 in the switching circuit 13 is connected to the terminal 32A and the content is stored in the storage area A.

On the other hand, in a case where the storage controller 42 determines in step S104 that the storage area A does not have an enough free storage space to store the content specified to be stored, the storage controller 42 skips step S105 and ends the present process.

In a case where the storage controller 42 determines in step S102 that the content to be stored is not a content specified to be finally dubbed to a Blu-ray disk 5A, the storage controller 42 advances the process to step S106. In step S106, the storage controller 42 determines whether the content to be stored is a content specified to be finally dubbed to a DVD 5C.

If the storage controller 42 determines in step S106 that the content to be stored is a content specified to be finally dubbed to a DVD 5C, the storage controller 42 advances the process to step S107. In step S107, the storage controller 42 accesses the HDD 15 to detect the total data size of contents already stored in the storage area B.

In step S108, the storage controller 42 determines whether the result of checking in step S107 indicates that the storage area B has an enough free storage space to store the content specified to be stored.

If the storage controller 42 determines in step S108 that the storage area B has an enough free storage space to store the content specified to be stored, the storage controller 42 advances the process to step S109. In step S109, the storage controller 42 sets the automatic recording programming such that the content of interest will be stored in the storage area B, and, thereafter, the storage controller 42 ends the present process. When broadcasting of the content of interest is started, the switch 31 in the switching circuit 13 is connected to the terminal 32B, and the content output from the terminal 32B is converted by the transcoder 21-1 into a specified format and stored in the storage area B of the HDD 15.

On the other hand, in a case where the storage controller 42 determines in step S108 that the storage area B does not have an enough free storage space to store the content specified to be stored, the storage controller 42 skips step S109 and ends the present process.

In a case where the storage controller 42 determines in step S106 that the content to be stored is not a content specified to be finally dubbed to a DVD 5C, the storage controller 42 determines that the content of interest is a content specified to be finally dubbed to a memory card 5B, and the storage controller 42 advances the process to step S110.

In step S110, the storage controller 42 accesses the HDD 15 to detect the total data size of contents already stored in the storage area C.

In step S111, the storage controller 42 determines whether the result of checking in step S110 indicates that the storage area C has an enough free storage space to store the content specified to be stored.

If the storage controller 42 determines in step S111 that the storage area C has an enough free storage space to store the content specified to be stored, the storage controller 42 advances the process to step S112. In step S112, the storage controller 42 sets the automatic recording programming such that the content of interest will be stored in the storage area C, and, thereafter, the storage controller 42 ends the present process. When broadcasting of the content of interest is started, the switch 31 in the switching circuit 13 is connected to the terminal 32C, and the content output from the terminal 32C is converted by the transcoder 21-2 into a specified format and stored in the storage area C of the HDD 15.

On the other hand, in a case where the storage controller 42 determines in step S111 that the storage area C does not have an enough free storage space to store the content specified to be stored, the storage controller 42 skips step S112 and ends the present process.

The manner of controlling the operation of storing a content in a storage area of the HDD 15 depending on the capacity of the storage area has been described above.

In response to a command issued by a user, the total data size of contents already stored in the HDD 15 may be displayed in the form of a circular chart or a bar chart separately for each of the storage areas A, B, and C in a similar manner as described above with reference to FIG. 4 so that the user can visually understand the remaining storage space. Alternatively, as described above with reference to FIG. 5, when the free space of some of the storage areas A, B, and C has decreased to a level lower than a predetermined threshold value, a warning may be given to a user via a UI screen, voice, or e-mail. When the free space of some storage area has decreased to a level lower than the predetermined threshold value, contents stored in this storage area may be automatically saved into the external storage medium 4 or the removable storage medium 5.

Figure 24:
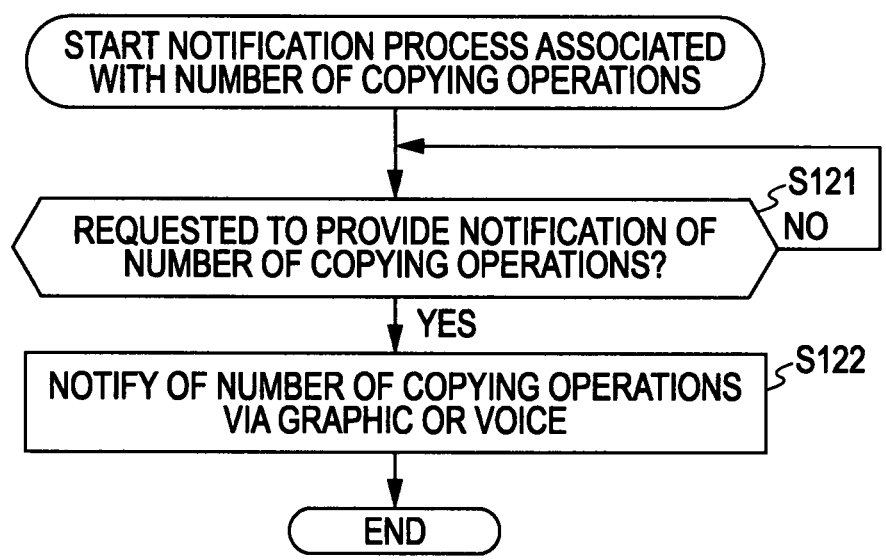
FIG. 24 is a flow chart illustrating a process performed by a content storage apparatus to provide a notification of the number of times a content has been copied, according to an embodiment of the present invention.

Now, referring to a flow chart shown in FIG. 24, described below is a process performed by the content storage apparatus 1 to provide a notification of the maximum number of copying operations allowed for each content stored in each storage area.

In step S121, the content manager 43 determines whether a user has issued a request for a notification of the maximum allowable number of copying operations. If it is determined that the request has not been issued, the process waits in step S121 until the request is issued. Note that issuing of the request is performed, for example, via a remote control.

If the content manager 43 determines in step S121 that the user has issued a request for the notification of the maximum allowable number of copying operations, the content manager 43 advances the process to step S122. In step S122, the content manager 43 accesses the HDD 15 to acquire information, such as that shown in FIG. 21, indicating the maximum number of copying operations allowed for each content stored in each of the storage areas A, B, and C. The content manager 43 then controls the display controller 44 and the output controller 45 to display graphic information on the TV 2 and/or output audio information from the TV 2 to provide the notification of the maximum allowable number of copying operations.

In the above explanation, it is assumed that storing of contents in each of the storage areas A, B, and C is restricted according to the total data size of already-stored contents. Alternatively, in the content storage apparatus 1 shown in FIG. 18, storing of contents may be restricted according to the total number of already-stored contents as described below.

Figure 25:
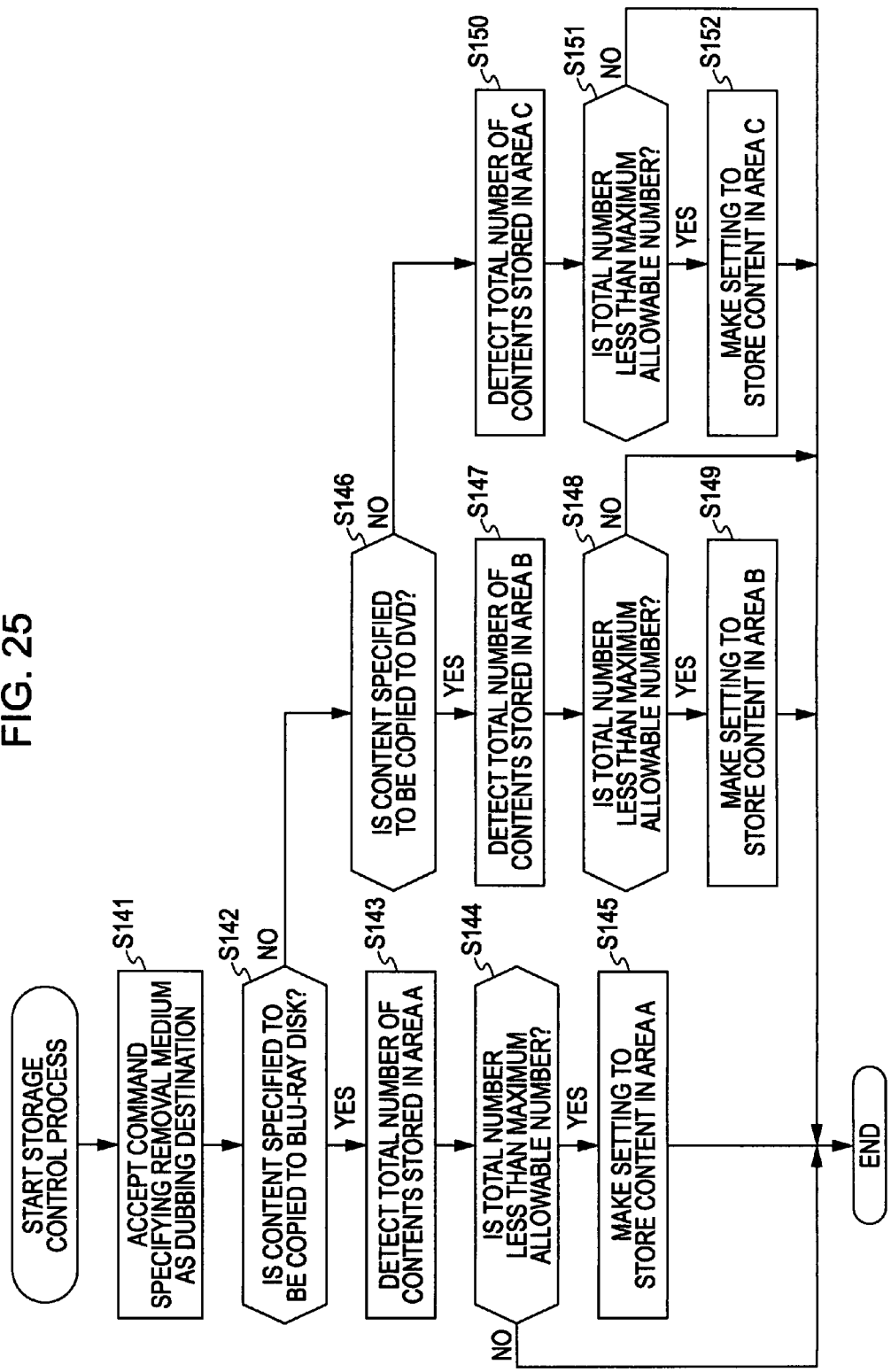
FIG. 25 is a flow chart illustrating a storage control process performed by a content storage apparatus according to an embodiment of the present invention.

Referring to a flow chart shown in FIG. 25, described below is a process performed by the content storage apparatus 1 to control storing of contents in each of the storage areas A, B, and C according to the total number of contents stored in each storage area.

Figure 23:
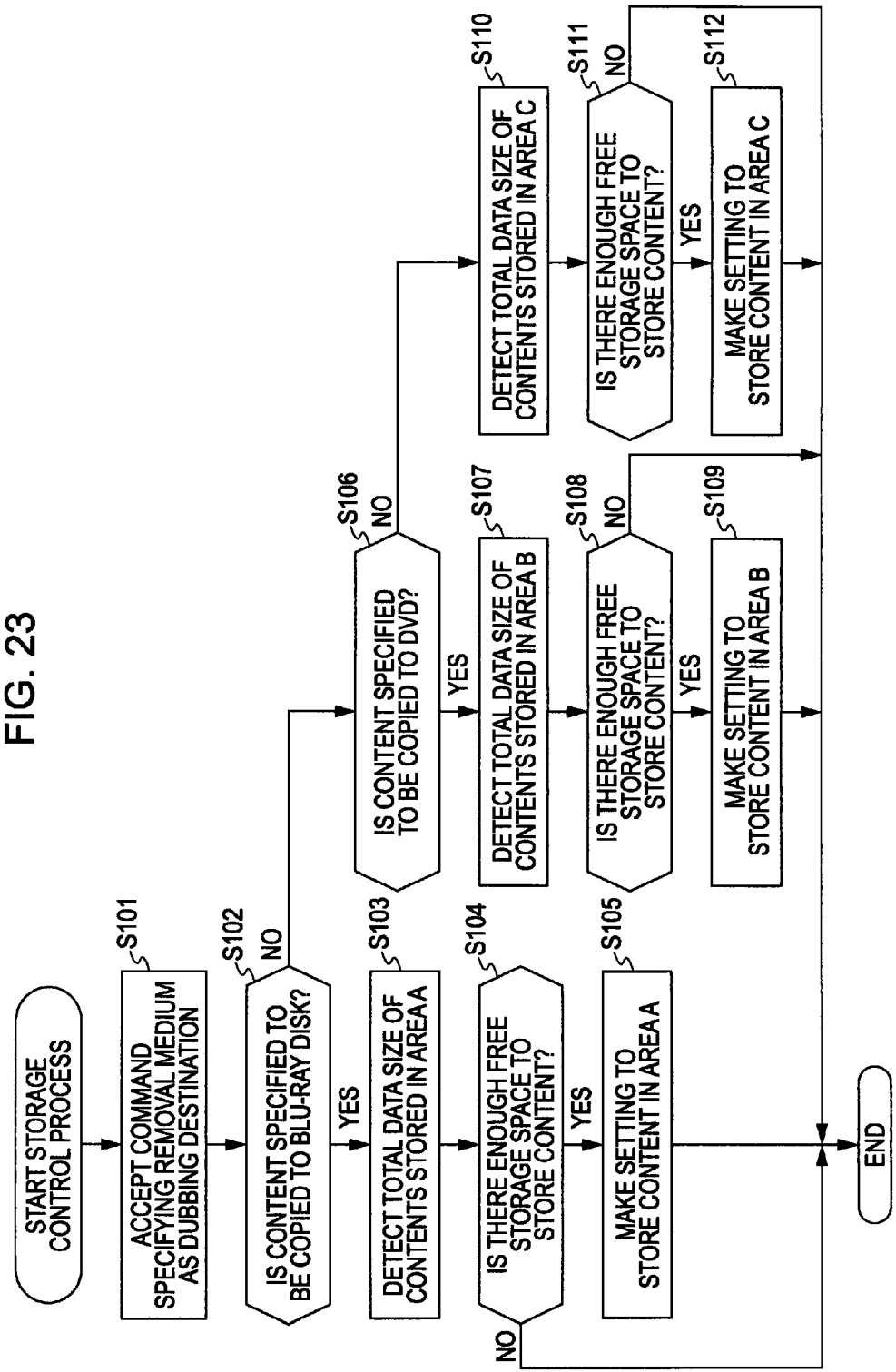
FIG. 23 is a flow chart illustrating a storage control process performed by a content storage apparatus according to an embodiment of the present invention.

This process is performed, for example, when setting is made to automatically store a broadcast program content, as with the process shown in FIG. 23. In the automatic recording setting process, after a content to be stored is specified, a removable storage medium 5 used as a final dubbing destination is specified by a user. When a removable storage medium 5 is specified as the final dubbing destination by the user, information indicating the specified removable storage medium 5 is supplied to the storage controller 42.

In step S141, the storage controller 42 receives information indicating the removable storage medium 5 specified as the final dubbing destination. In next step S142, the storage controller 42 determines whether the content to be stored is a content specified to be finally dubbed to a Blu-ray disk 5A.

If the storage controller 42 determines in step S142 that the content to be stored is a content specified to be finally dubbed to a Blu-ray disk 5A, then the storage controller 42 advances the process to step S143. In step S143, the storage controller 42 accesses the HDD 15 to detect the total number of contents already stored in the storage area A.

In step S144, the storage controller 42 determines whether the result of checking in step S143 indicates that the number of contents already stored in the storage area A is smaller than the predefined maximum allowable number.

If the storage controller 42 determines in step S144 that the number of contents already stored in the storage area A is smaller than the predefined maximum allowable number, the storage controller 42 advances the process to step S145. In step S145, the storage controller 42 sets the automatic recording programming such that the content of interest will be stored in the storage area A, and, thereafter, the storage controller 42 ends the present process. When broadcasting of the content of interest is started, the switch 31 in the switching circuit 13 is connected to the terminal 32A and the content is stored in the storage area A.

On the other hand, in a case where the storage controller 42 determines in step S144 that the number of contents already stored in the storage area A has reached the predefined maximum allowable number, the storage controller 42 skips step S145 and ends the present process.

In a case where the storage controller 42 determines in step S142 that the content to be stored is not a content specified to be finally dubbed to a Blu-ray disk 5A, the storage controller 42 advances the process to step S146. In step S146, the storage controller 42 determines whether the content to be stored is a content specified to be finally dubbed to a DVD 5C.

If the storage controller 42 determines in step S146 that the content to be stored is a content specified to be finally dubbed to a DVD 5C, then in step S147, the storage controller 42 accesses the HDD 15 to detect the total number of contents already stored in the storage area B.

In step S148, the storage controller 42 determines whether the result of checking in step S147 indicates that the number of contents already stored in the storage area B is smaller than the predefined maximum allowable number.

If the storage controller 42 determines in step S148 that the number of contents already stored in the storage area B is smaller than the predefined maximum allowable number, the storage controller 42 advances the process to step S149. In step S149, the storage controller 42 sets the automatic recording programming such that the content of interest will be stored in the storage area B, and, thereafter, the storage controller 42 ends the present process. When broadcasting of the content of interest is started, the switch 31 in the switching circuit 13 is connected to the terminal 32B, and the content output from the terminal 32B is converted by the transcoder 21-1 into a specified format and stored in the storage area B of the HDD 15.

On the other hand, in a case where the storage controller 42 determines in step S148 that the number of contents already stored in the storage area B has reached the predefined maximum allowable number, the storage controller 42 skips step S149 and ends the present process.

In a case where the storage controller 42 determines in step S146 that the content to be stored is not a content specified to be finally dubbed to a DVD 5C, the storage controller 42 determines that the content of interest is a content specified to be finally dubbed to a memory card 5B, and the storage controller 42 advances the process to step S150.

In step S150, the storage controller 42 accesses the HDD 15 to detect the total number of contents already stored in the storage area C.

In step S151, the storage controller 42 determines whether the result of checking in step S150 indicates that the number of contents already stored in the storage area C is smaller than the predefined maximum allowable number.

If the storage controller 42 determines in step S151 that the number of contents already stored in the storage area C is smaller than the predefined maximum allowable number, the content manager 43 advances the process to step S152. In step S152, the storage controller 42 sets the automatic recording programming such that the content of interest will be stored in the storage area C, and, thereafter, the storage controller 42 ends the present process. When broadcasting of the content of interest is started, the switch 31 in the switching circuit 13 is connected to the terminal 32C, and the content output from the terminal 32C is converted by the transcoder 21-2 into a specified format and stored in the storage area C of the HDD 15.

On the other hand, in a case where the storage controller 42 determines in step S151 that the number of contents already stored in the storage area C has reached the predefined maximum allowable number, the storage controller 42 skips step S152 and ends the present process.

The manner of controlling the operation of storing a content in each storage area of the HDD 15 depending on the number of contents already stored in each storage area has been described above.

In this embodiment described above, in response to a request issued by a user, the total number of contents already stored in the HDD 15 may be displayed in the form of a circular chart or a bar chart separately for each of the storage areas A, B, and C in a similar manner as described above with reference to FIG. 4 so that the user can visually understand the remaining storage space. Alternatively, as described above with reference to FIG. 5, when the number of contents allowed to be further stored in one of the storage areas A, B, and C has decreased to a level lower than a predetermined threshold value, a warning may be given to a user via a UI screen, voice, or e-mail. When the number of contents allowed to be further stored in a particular storage area has become less than a predetermined threshold value, contents stored in this storage area may be automatically saved into the external storage medium 4 or the removable storage medium 5.

As described above with reference to FIGS. 23 and 25, contents stored in the respective storage areas of the HDD 15 are dubbed to removable storage media 5 of types specified for the respective storage areas (in step S44 of FIG. 14). That is, a content stored in the storage area A is dubbed to a Blu-ray disk 5A, and a content stored in the storage area B is dubbed to a DVD 5C. A content stored in the storage area C is dubbed to a memory card 5B.

In the example described above, it is assumed that storing of contents is restricted in accordance with the total data size of already stored contents or in accordance with the total number of already stored content, for each of all storage areas A to C of the HDD 15. Alternatively, the restriction may be imposed only on one of or some of storage areas, such as the storage area A or the storage area B.

In the examples described above, a content is moved from the HDD 15 to a removable storage medium 5. Alternatively, when a content is received, the content may be directly stored in a removable storage medium mounted on the content storage apparatus 1, and the content may be moved from this removable storage medium to another removable storage medium 5.

In this case, the original content stored in the removable storage medium is moved to a removable storage medium 5 mounted on or connected to the content storage apparatus 1. As for the removable storage medium for first storing an original content, for example, a Blu-ray disk may be used.

FIG. 26 illustrates an example of a configuration of the content storage apparatus 1 which allows a removable storage medium to be used to first store a content which may be moved later. In FIG. 26, similar parts to those in FIG. 1 are denoted by similar reference numerals.

In the content storage apparatus 1 shown in FIG. 26, only the storage area A is formed in the HDD 15, and the storage area B is formed on a removable storage medium 61 such as a Blu-ray disk mounted on the content storage apparatus 1.

Under the control of the CPU 14, the digital broadcast tuner 11 receives a broadcast signal via an antenna (not shown in FIG. 18), demodulates the received broadcast signal, and outputs a transport stream broadcast in a particular channel to a demultiplexer (DEMUX) 12.

Under the control of the CPU 14, the DEMUX 12 extracts a particular stream from the transport stream and supplies the extracted stream, as a content to be stored, to a switching circuit 13. The DEMUX 12 extracts SI from the transport stream and supplies it to the CPU 14.

Under the control of the CPU 14, the switching circuit 13 connects the switch 31 to the terminal 32A or the terminal 32B so that the content output from the DEMUX 12 is supplied to the HDD 15 or the removable storage medium 61. In a state in which the switch 31 is connected to the terminal 32A, the content output from the switching circuit 13 is stored in the HDD 15 (storage area A). On the other hand, in a state in which the switch 31 is connected to the terminal 32B, the content output from the switching circuit 13 is stored in the removable storage medium 61 (storage area B).

The CPU 14 controls the operation over the whole content storage apparatus 1 shown in FIG. 26. For example, the CPU 14 analyzes SI supplied from the DEMUX 12 and determines, depending on a result of the analysis and setting of the HDD 15 and the removable storage medium 61, whether a content of interest should be stored in the storage, area A of the HDD 15 or the storage area B of the removable storage medium 61.

In a case where the CPU 14 determines that the content of interest to be stored is a copy-once content and that the storage area A of the HDD 15 is specified as a storage area for storing the content of interest, the CPU 14 controls the switching circuit 13 such that the switch 31 is connected to the terminal 32A.

On the other hand, in a case where the CPU 14 determines that the content of interest to be stored is a copy-once content and that the storage area B of the removable storage medium 61 is specified as a storage area for storing the content of interest, or in a case where the CPU 14 determines that the content of interest to be stored is of a type, such as a copy-free content, other than copy-once contents, the CPU 14 controls the switching circuit 13 such that the switch 31 is connected to the terminal 32B.

The CPU 14 acquires capacity information of the area A from the HDD 15 and notifies the user of the storage capacity. Similarly, the CPU 14 acquires capacity information of the area B from the removable medium 61, and notifies the user of the storage capacity.

The storage area A of the HDD 15 shown in FIG. 26 has a function similar to the storage area A of the HDD 15 shown in FIG. 1, and the storage area B of the removable storage medium 61 shown in FIG. 26 has a function similar to the storage area B of the HDD 15 shown in FIG. 1. That is, the storage area A of the HDD 15 is special in that when a copy-once content stored in this area is "moved" to a removable storage medium 5, the original content is allowed to remain in this area without being deleted. When there is a setting defining the maximum number of times the content is allowed to be copied, the content is allowed to be copied up to the defined maximum number of times.

On the other hand, the storage area B of the removable storage medium 61 is an original storage area characterized in that when a copy-once content stored in this area is moved to a removable storage medium 5, the original content is forced to be deleted. Copy-free contents stored in the storage area B are allowed to be copied unlimitedly. Note that the storage area B may be formed in the HDD 15, and the storage area A may be formed in the removable storage medium 61.

Contents stored in the storage area A of the HDD 15 and contents stored in the storage area B of the removable storage medium 61 may be supplied, as required, to the decoder 16 or the network terminal 20.

The decoder 16 decodes the content supplied from the HDD 15 or the removable storage medium 61 and supplies resultant video data to the graphic circuit 17.

In accordance with GUI data supplied from the CPU 14, the graphic circuit 17 produces data graphically indicating the ratio of the size of storage space occupied by contents already stored in the storage area A of the HDD or the storage area B of the removable storage medium 61 to the total size of storage space of each storage area, and displays the resultant graphic information on the TV 2 via the video terminal 18.

The video terminal 18 displays various images on the TV 2 in accordance with data supplied from the graphic circuit 17.

The audio terminal 19 outputs various voices/sounds via a speaker of the TV 2 in accordance with data supplied from the CPU 14.

Under the control of the CPU 14, the network terminal 20 reads a content stored in the storage area A of the HDD 15 or a content stored in the storage area B of the removable storage medium 61, and stores the read content in the external storage medium 4. Under the control of the CPU 14, the network terminal 20 sends a message indicating the capacity of the HDD 15 to a personal computer 22 or a portable telephone 23 via a mail server 21.

As described above, the storage areas A and B may be formed in storage media which are physically separated and which are different in type.

In the embodiments described above, a content processed by the content storage apparatus 1 is assumed to be a copy-free content or a copy-once content which is of a usual type or which is set to be allowed to be copied up to a predetermined number of times. Alternatively, the content storage apparatus 1 may be configured to deal with EPN (Encryption Plus Non-assertion) contents.

EPN contents are similar to copy-free contents in that they are allowed to be copied without restriction, but different in that EPN contents are output in an encrypted form according to the ARIB standard.

Figure 27:
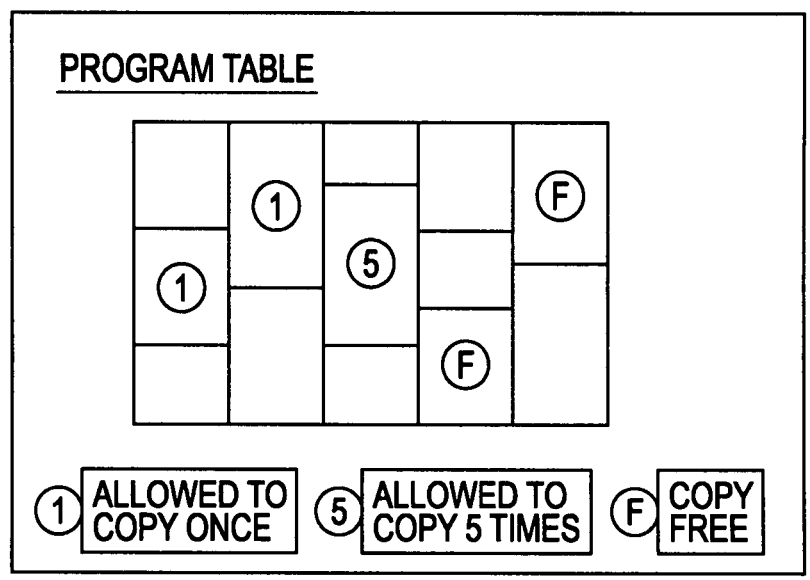
FIG. 27 is a diagram illustrating an example of a displayed program table.

FIG. 27 illustrates an example of a broadcast program table displayed by the content storage apparatus 1 configured to handle EPN contents and copy-once contents allowed to be copied up to N times.

In this example of the broadcast program table shown in FIG. 27, an icon indicating that copying is allowed 1 time is displayed in each box of a usual copy-once content, while an icon indicating that copying is allowed 5 times is displayed in each box of a copy-once content set as allowed to be copied up to 5 times. An icon indicating that copying is allowed without restriction is displayed in each box of an EPN content.

More specifically, in FIG. 27, each box having a circular icon with a numeric symbol of "1" is a box of a usual copy-once content allowed to be copied once, each box having a circular icon with a numeric symbol of "5" is a box of a copy-once content allowed to be copied up to 5 times, and each box having a circular icon with a symbol of "F" is a box of an EPN content.

Icons on the broadcast program table allow a user to easily understand which contents are allowed to be copied once, up to 5 times, or without restrictions.

Figure 28:
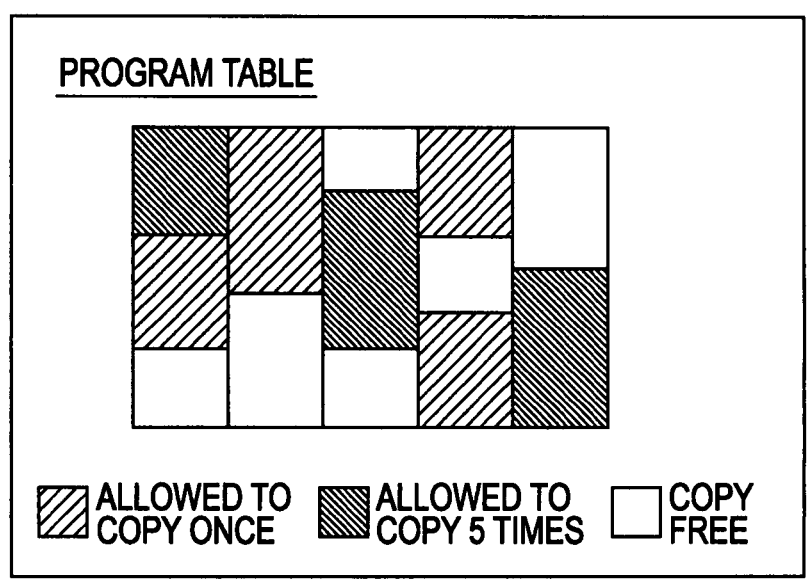
FIG. 28 is a diagram illustrating an example of a displayed program table.

FIG. 28 illustrates an example of a broadcast program table in which boxes are shaded with different colors depending on types of contents so that a user can easily understand what restrictions are imposed on respective contents.

More specifically, in the example shown in FIG. 28, content boxes are shaded with different colors so as distinguish among usual copy-once contents allowed to be copied once, copy-once contents allowed to be copied up to 5 times, and EPN contents.

FIG. 29 illustrates an example of a list of titles of contents stored in the HDD 15 or the removable storage medium 61. In the example shown in FIG. 29, the title list includes information indicating a restriction on copying imposed on each content.

More specifically, in the example shown in FIG. 29, the title list includes information indicating that content A is allowed to be copied up to 3 times, content B is allowed to be copied once, content C is allowed to be copied up to 5 times, and content D is an EPN content allowed to be copied without restrictions.

The title list may be switched by a user among a plurality of lists each including only contents which are equal in terms of restriction on copying.

For example, when a user issues a command to display a title list of copy-once contents allowed to be copied up to N times, a title list such as that shown in FIG. 30 may be displayed.

In the example shown in FIG. 30, the title list includes content A displayed in the title list shown in FIG. 29 as a copy-once content allowed to be copied 3 times, and content C displayed in the title list shown in FIG. 29 as a copy-once content allowed to be copied 5 times. The title list shown in FIG. 30 includes text information displayed at the bottom and indicating that contents displayed in the title list are allowed to be copied a plurality of times.

FIG. 31 illustrates an example of a title list which is displayed when a user issues a command to display a title list of EPN contents.

The title list shown in FIG. 31 includes content D displayed as an EPN content in the title list shown in FIG. 29. The title list shown in FIG. 31 includes text information displayed at the bottom and indicating that contents displayed in the title list are allowed to be copied without restrictions.

FIG. 32 illustrates an example of a title list which is displayed when a user issues a command to display a title list of usual copy-once contents allowed to be copied once.

The title list shown in FIG. 32 includes content B displayed as a usual copy-once content in the title list shown in FIG. 29. The title list shown in FIG. 32 includes text information displayed at the bottom and indicating that if a content included in the title list is dubbed (moved), the content will be deleted from the HDD 15.

When a title is selected from the title list or the list of contents programmed to be automatically recorded, text information may be displayed to indicate a restriction on copying imposed on the selected content.

FIG. 33 illustrates an example of a list of contents programmed to be automatically recorded.

In the example shown in FIG. 33, content A is selected from the list including contents A to D, and characters representing the selected content A are displayed in a highlighted manner. The title list shown in FIG. 33 includes text information displayed at the bottom and indicating that the selected content is allowed to be copied up to 3 times. The text information is switched depending on the selected content.

Figure 34:
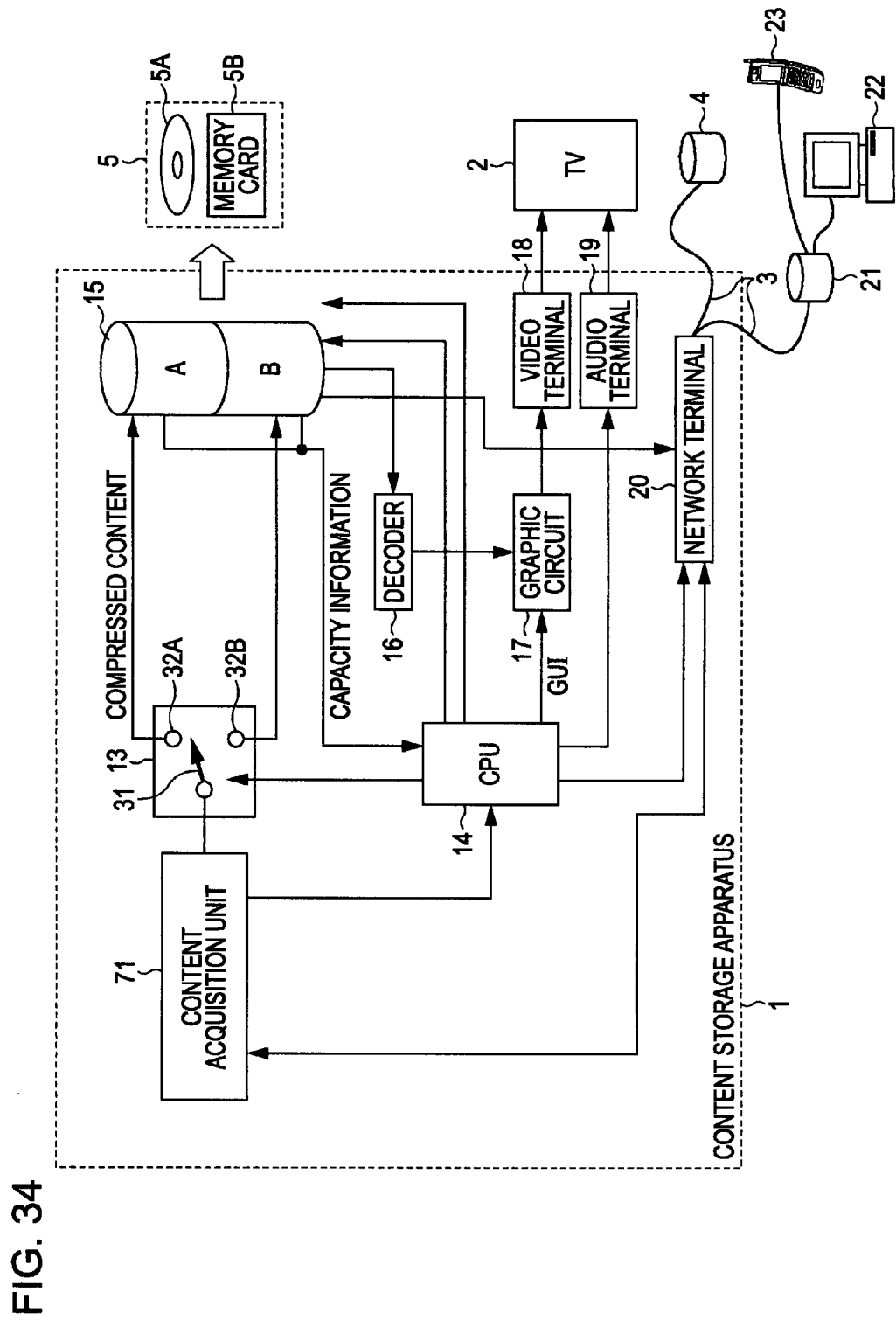
FIG. 34 is a block diagram illustrating an example of a configuration of a content storage apparatus according to an embodiment of the present invention.

FIG. 34 is a block diagram illustrating an example of a configuration of a content storage apparatus 1 in which the digital broadcast tuner 11 is replaced with a part adapted to acquire a content via a network 3. In FIG. 34, similar parts to those in FIG. 1 are denoted by similar reference numerals, and a duplicated explanation thereof is omitted herein.

A content acquisition unit 71 accesses a particular server via the network terminal 20 and the network 3 to acquire a content specified by a user as a content to be stored together with associated playback control information or DRM (Digital Rights Management) information defining a restriction on copying of the content. The content acquisition unit 71 supplies the acquired content to the switching circuit 13 and supplies the playback control information or DRM (Digital Rights Management) information to the CPU 14.

The CPU 14 analyzes the playback control information or DRM (Digital Rights Management) information supplied from the content acquisition unit 71 and determines whether the content of interest should be stored in the storage area A of the HDD 15 or the storage area B of the HDD 15.

As described above, the content storage apparatus 1 may be configured to have the capability of acquiring contents via the network 3.

The sequence of processing steps described above may be performed by means of hardware or software. When the processing sequence is executed by software, a program forming the software may be installed from a program storage medium onto a computer which is provided as dedicated hardware or may be installed onto a general-purpose computer capable of performing various processes in accordance with various programs installed thereon.

FIG. 35 is a block diagram illustrating an example of a personal computer configured to execute a program to perform the sequence of processing steps described above.

A CPU (Central Processing Unit) 201 performs various processes in accordance with a program stored in a ROM (Read Only Memory) 202 or a storage unit 208. A RAM (Random Access Memory) 203 stores the program executed by the CPU 201 and also stores data used in the execution of the program.

The CPU 201, the ROM 202, and the RAM 203 are connected to each other via a bus 204.

An input/output interface 205 is connected to the CPU 201 via the bus 204. The input/output interface 205 is also connected to an input unit 206 including a keyboard, a mouse, a microphone and the like and an output unit 207 including a display and a speaker. The CPU 201 performs various processes in accordance with commands input via the input unit 206 and outputs results of the processes to the output unit 207.

The storage unit 208 connected to the input/output interface 205 is realized, for example, by a hard disk and is adapted to store programs and data executed or used by the CPU 201. A communication unit 209 is adapted to communicate with an external apparatus via a network such as the Internet or a local area network.

When a removable medium 211 such as a magnetic disk, an optical disk, a magneto-optical disk or a semiconductor memory is mounted on a drive 210 connected to the input/output interface 205, the drive 210 drives the mounted removable medium 211 and acquires a program or data stored thereon. The acquired program or data is transferred, as required, to the storage unit 208 and stored therein.

The removable medium 211 shown in FIG. 35 is an example of a program storage medium usable for storing a computer-executable program to be installed in the computer.

Specific examples of removable media for this purpose include a magnetic disk (such as a floppy disk), an optical disk (such as a CD-ROM (Compact Disk-Read Only Memory) and a DVD (Digital Versatile Disk)), a magneto-optical disk, and a semiconductor memory. A program may be stored temporarily or permanently in the ROM 202 or in the storage unit 208 such as a hard disk or the like. The program may be stored in the program storage medium via a wire communication medium such as a local area network or the Internet or via a wireless communication medium such as digital broadcasting, using the communication unit 209 serving as an interface such as a router or a modem.

In the present description, the steps described in the program may be performed either in time sequence in accordance with the order described in the program or in a parallel or separate fashion.

It should be understood by those skilled in the art that various modifications, combinations, sub-combinations and alterations may occur depending on design requirements and other factors insofar as they are within the scope of the appended claims or the equivalents thereof.

What is claimed is:

1. A content storage apparatus, comprising:
   receiving means for receiving a content and service information associated with the content;
   storage means, including at least a first storage area and a second storage area, for storing the content received by the receiving means; and
   control means for determining one of the first and second storage areas as a storage area for storing the content in accordance with at least the service information received by the receiving means, and for controlling the storage means such that in response to a user specifying that a piece of copy-once content stored therein is to be moved to another storage medium, (i) if such copy-once content is stored in the first storage area, the copy-once content is stored in the another storage medium without the original copy-once content stored in the first storage area being deleted, and (ii) if such copy-once content is stored in the second storage area, the copy-once content is stored in the another storage medium and the original copy-once content stored in the second storage area is deleted.

2. The content storage apparatus according to claim 1, wherein the first storage area and the second storage area are partitioned according to the service information.

3. The content storage apparatus according to claim 1, wherein the control means has correspondence information prestored therein and indicating the correspondence between the service information and a storage destination selected from the storage areas of the storage means.

4. The content storage apparatus according to claim 1, wherein the first storage area is restricted on the total data size of contents stored therein.

5. The content storage apparatus according to claim 4, further comprising means for notifying a user of the total data size of already stored contents and notifying of the size of remaining free space given by the subtraction of the total data size of already stored contents from a predetermined value, by providing the notification in a visible or audible form via a screen or an audio output apparatus.

6. The content storage apparatus according to claim 4, further comprising means for notifying a user of the total data size of already stored contents and notifying of the size of remaining free space given by the subtraction of the total data size of already stored contents from a predetermined value, by providing the notification to the user by electronic mail.

7. The content storage apparatus according to claim 1, further comprising means for, when the size of free space remaining in the first storage area decreases to a low level, saving one or more contents stored in the first storage area to an external storage medium.

8. The content storage apparatus according to claim 1, wherein the first storage area is restricted on the total number of contents stored therein.

9. The content storage apparatus according to claim 1, wherein in response to the user specifying that the piece of copy-once content stored in one of the storage areas is to be moved to the another storage medium, the control means controls the storage means such that when such copy-once content, if stored in the first storage area and set as allowed to be copied up to N times, is copied to one or more other storage mediums N times, playback of this content is disabled.

10. The content storage apparatus according to claim 9, further comprising means for notifying a user of the maximum allowable number of copying operations, by providing the notification in a visible or audible form via a screen or an audio output apparatus.

11. The content storage apparatus according to claim 9, further comprising means for notifying a user of the maximum allowable number of copying operations, by providing the notification by electronic mail.

12. The content storage apparatus according to claim 1, wherein copy-free contents allowed to be copied without restriction are stored in the second storage area.

13. The content storage apparatus according to claim 1, wherein the control means determines, according also to a setting of the first and second storage areas, whether the content should be stored in the first storage area or the second storage area of the storage means.

14. The content storage apparatus according to claim 1, further comprising means for notifying a user that if the content is stored in another storage medium, the original content will be deleted and/or the content stored in another storage medium will has a resolution less than the resolution of the original content, by providing the notification in a visible or audible form via a screen or an audio output apparatus.

15. The content storage apparatus according to claim 1, wherein the first storage area and the second storage area are physically or logically partitioned.

16. The content storage apparatus according to claim 1, wherein the control means determines another of the first and second storage areas as a storage area for storing one or more clones of the content in accordance with the at least service information.

17. The content storage apparatus according to claim 1, wherein at least one of the first storage area, the second storage area, or the another storage medium is a blu-ray disk.

18. A content storage method, comprising:
   receiving a content and service information associated with the content;
   storing the received content in storage means that includes at least a first storage area and a second storage area;
   determining one of the first and second storage areas as a storage area for storing the content in accordance with at least the received service information; and
   controlling the storage means such that in response to a user specifying that a piece of copy-once content stored therein is to be moved to another storage medium, (i) if such copy-once content is stored in the first storage area, the copy-once content is stored in the another storage medium without the original copy-once content stored in the first storage area being deleted, and (ii) if such copy-once content is stored in the second storage area, the copy-once content is stored in the another storage medium and the original copy-once content stored in the second storage area is deleted.

19. The content storage method according to claim 18, further comprising determining another of the first and second storage areas as a storage area for storing one or more clones of the content in accordance with the at least service information.

20. The content storage method according to claim 18, wherein at least one of the first storage area, the second storage area, or the another storage medium is a blu-ray disk.

21. A non-transitory storage medium including a program stored therein and executable by a computer to perform a process comprising:
   receiving a content and service information associated with the content;
   storing the received content in storage means that includes at least a first storage area and a second storage area;
   determining one of the first and second storage areas as a storage area for storing the content in accordance with at least the received service information; and
   controlling the storage means such that in response to a user specifying that a piece of copy-once content stored therein is to be moved to another storage medium, (i) if such copy-once content is stored in the first storage area, the copy-once content is stored in the another storage medium without the original copy-once content stored in the first storage area being deleted, and (ii) if such copy-once content is stored in the second storage area, the copy-once content is stored in the another storage medium and the original copy-once content stored in the second storage area is deleted.

22. The non-transitory storage medium according to claim 21, wherein the process further comprises determining another of the first and second storage areas as a storage area for storing one or more clones of the content in accordance with the at least service information.

23. The non-transitory storage medium according to claim 21, wherein at least one of the first storage area, the second storage area, or the another storage medium is a blu-ray disk.

24. A processor encoded with a program executable by a computer to perform a process comprising:
   receiving a content and service information associated with the content;
   storing the received content in storage means that includes at least a first storage area and a second storage area;
   determining one of the first and second storage areas as a storage area for storing the content, in accordance with at least the received service information; and
   controlling the storage means such that in response to a user specifying that a piece of copy-once content stored therein is to be moved to another storage medium, (i) if such copy-once content is stored in the first storage area, the copy-once content is stored in the another storage medium without the original copy-once content stored in the first storage area being deleted, and (ii) if such copy-once content is stored in the second storage area, the copy-once content is stored in the another storage medium and the original copy-once content stored in the second storage area is deleted.

25. The processor according to claim 24, wherein the process further comprises determining another of the first and second storage areas as a storage area for storing one or more clones of the content in accordance with the at least service information.

26. The processor according to claim 24, wherein at least one of the first storage area, the second storage area, or the another storage medium is a blu-ray disk.

27. A content storage apparatus, comprising:
   means for displaying a list of content on a screen such that content received as copy-once content and set as being allowed to be copied for one generation are distinguished from other content by having a color different than a color of the other content;
   storage means including at least a first storage area and a second storage area; and
   control means for controlling the storage means such that in response to a user specifying that a piece of the copy-once content stored therein is to be moved to another storage medium, (i) if such copy-once content is stored in the first storage area, the copy-once content is stored in the another storage medium without the original copy-once content stored in the first storage area being deleted, and (ii) if such copy-once content is stored in the second storage area, the copy-once content is stored in the another storage medium and the original copy-once content stored in the second storage area is deleted.

28. The content storage apparatus according to claim 27, wherein the list of contents is a title list of contents already stored, a broadcast program table, a list of contents programmed to be automatically stored, or a content list for use to select a content to be stored in another storage medium.

29. The content storage apparatus according to claim 27, further comprising means for displaying the list of contents in such a manner that a list of copy-once contents set as allowed to be copied for one generation and a list of the other contents are displayed separately and distinguishably, in accordance with a command issued by a user.

30. The content storage apparatus according to claim 27, further comprising means for, when a copy-once content is selected by a user from the list of contents, displaying a text message to provide information associated with copying of the selected copy-once content.

31. The content storage apparatus according to claim 27, wherein the control means determines another of the first and second storage areas as a storage area for storing one or more clones of the content in accordance with the at least service information.

32. The content storage apparatus according to claim 27, wherein at least one of the first storage area, the second storage area, or the another storage medium is a blu-ray disk.

33. A content storage apparatus, comprising:
   storage means, including at least a first storage area and a second storage area, for storing a content; and
   control means for controlling the storage means such that an entity and a clone of a content received as copy-once content and set as being allowed to be copied up to a predetermined number of times are stored in the first storage area, in response to the copy-once content being copied using the clone thereof the predetermined number of times, the entity of the copy-once content is moved to the second storage area and the clone of the copy-once content is deleted from the first storage area, and after the copy-once content is moved to the second storage area, copying of this copy-once content is disabled.

34. The content storage apparatus according to claim 33, wherein at least one of the first storage area or the second storage area is a blu-ray disk.

35. A content storage apparatus, comprising:
   storage means, including at least a first storage area and a second storage area, for storing a content; and control means for controlling the storage means such that an entity of a content received as copy-once content and set as being allowed to be copied up to a predetermined number of times and as many clones of this copy-once content as the predetermined number of times copying is allowed are stored in the first storage area, and each time the copy-once content is copied using one of clones thereof, the one of clones of the copy-once content is deleted from the first storage area, wherein in response to the copy-once content being copied the predetermined number of times, the entity of the copy-once content is moved to the second storage area, and copying of the copy-once content using the entity thereof stored in the second storage area is disabled.

36. The content storage apparatus according to claim 35, wherein at least one of the first storage area or the second storage area is a blu-ray disk.

37. A content storage apparatus comprising:
a receiving unit adapted to receive a content and service information associated with the content;
a storage unit, including at least a first storage area and a second storage area, adapted to store the content received by the receiving unit; and
a controller adapted to determine one of the first and second storage areas as a storage area for storing the content in accordance with at least the service information received by the receiving unit and to control the storage unit such that in response to a user specifying that a piece of copy-once content stored therein is to be moved to another storage medium, (i) if such copy-once content is stored in the first storage area, the copy-once content is stored in the another storage medium without the original copy-once content stored in the first storage area being deleted, and (ii) if such copy-once content is stored in the second storage area, the copy-once content is stored in the another storage medium and the original copy-once content stored in the second storage area is deleted.

38. The content storage apparatus according to claim 37, wherein the controller determines another of the first and second storage areas as a storage area for storing one or more clones of the content in accordance with the at least service information.

39. The content storage apparatus according to claim 37, wherein at least one of the first storage area, the second storage area, or the another storage medium is a blu-ray disk.

40. A content storage apparatus comprising:
a unit that displays a list of contents on a screen such that contents received as copy-once contents set as allowed to be copied for one generation are distinguished from the other contents by having a color different than a color of the other contents;
a storage unit including at least a first storage area and a second storage area; and
a control unit that controls the storage unit such that in response to a user specifying that a piece of the copy-once content stored therein is to be moved to another storage medium, (i) if such copy-once content is stored in the first storage area, the copy-once content is stored in the another storage medium without the original copy-once content stored in the first storage area being deleted, and (ii) if such copy-once content is stored in the second storage area, the copy-once content is stored in the another storage medium and the original copy-once content stored in the second storage area is deleted.

41. The content storage apparatus according to claim 40, wherein the controller determines another of the first and second storage areas as a storage area for storing one or more clones of the content in accordance with the at least service information.

42. The content storage apparatus according to claim 40, wherein at least one of the first storage area, the second storage area, or the another storage medium is a blu-ray disk.

43. A content storage apparatus, comprising:
a storage unit, including at least a first storage area and a second storage area, adapted to store a content; and
a controller adapted to control the storage unit such that an entity and a clone of a content received as copy-once content and set as being allowed to be copied up to a predetermined number of times are stored in the first storage area, and in response to the copy-once content being copied using the clone thereof the predetermined number of times, the entity of the copy-once content is moved to the second storage area and the clone of the copy-once content is deleted from the first storage area, and after the copy-once content is moved to the second storage area, copying of this copy-once content is disabled.

44. The content storage apparatus according to claim 43, wherein at least one of the first storage area or the second storage area is a blu-ray disk.

45. A content storage apparatus, comprising:
a storage unit, including at least a first storage area and a second storage area, adapted to store a content; and
a controller adapted to control the storage unit such that an entity of a content received as copy-once content and set as being allowed to be copied up to a predetermined number of times and as many clones of this copy-once content as the predetermined number of times copying is allowed are stored in the first storage area, and each time the copy-once content is copied using one of clones thereof, the one of clones of the copy-once content is deleted from the first storage area, wherein in response to the copy-once content being copied the predetermined number of times, the entity of the copy-once content is moved to the second storage area, and copying of the copy-once content using the entity thereof stored in the second storage area is disabled.

46. The content storage apparatus according to claim 45, wherein at least one of the first storage area or the second storage area is a blu-ray disk.

* * * * *